US007067150B2

(12) United States Patent
Farber et al.

(10) Patent No.: US 7,067,150 B2
(45) Date of Patent: *Jun. 27, 2006

(54) DELIVERY SYSTEMS FOR FUNCTIONAL INGREDIENTS

(75) Inventors: Michael Farber, Ville St. Laurent (CA); Jonathan Farber, Montreal (CA)

(73) Assignee: Scepter Holdings, Inc., Toronto (CA)

( * ) Notice: Subject to any disclaimer, the term of this patent is extended or adjusted under 35 U.S.C. 154(b) by 286 days.

This patent is subject to a terminal disclaimer.

(21) Appl. No.: 10/416,547

(22) PCT Filed: Mar. 25, 2003

(86) PCT No.: PCT/CA03/00411

§ 371 (c)(1),
(2), (4) Date: Jun. 13, 2003

(87) PCT Pub. No.: WO03/088755

PCT Pub. Date: Oct. 30, 2003

(65) Prior Publication Data

US 2004/0237663 A1 Dec. 2, 2004

Related U.S. Application Data

(60) Provisional application No. 60/372,438, filed on Apr. 16, 2002.

(51) Int. Cl.
*A61K 9/14* (2006.01)

(52) U.S. Cl. .................. 424/488; 424/484; 424/439; 424/440

(58) Field of Classification Search ................. 424/440, 424/441, 465, 439, 456, 451, 455
See application file for complete search history.

(56) References Cited

U.S. PATENT DOCUMENTS

| | | | |
|---|---|---|---|
| 2,558,065 A | 6/1951 | Tice | |
| 2,584,307 A | 2/1952 | Tice | |
| 3,582,359 A | 6/1971 | Horn et al. | |
| 3,867,560 A | 2/1975 | Menzi et al. | |
| 3,939,001 A | 2/1976 | Clausi et al. | |
| 4,224,353 A | 9/1980 | Kueper et al. | |
| 4,284,652 A | 8/1981 | Christensen | |
| 4,396,604 A | 8/1983 | Mitra | |
| 4,396,631 A | 8/1983 | Adachi et al. | |
| 4,517,216 A | 5/1985 | Shim | |
| 4,545,989 A | 10/1985 | Becker et al. | |
| 4,554,169 A | 11/1985 | Anderson et al. | |
| 4,582,709 A | 4/1986 | Peters et al. | |
| 4,597,981 A | 7/1986 | Kastin | |
| 4,671,967 A | 6/1987 | Patel et al. | |
| 4,684,534 A | 8/1987 | Valentine | |
| 4,778,676 A | 10/1988 | Yang et al. | |
| 4,780,324 A | 10/1988 | Knebl et al. | |
| 4,786,521 A | 11/1988 | Bennett et al. | |
| 4,790,991 A | 12/1988 | Shaw et al. | |
| 4,797,288 A | 1/1989 | Sharma et al. | |
| 4,869,916 A | 9/1989 | Clark et al. | |
| 4,876,105 A | 10/1989 | Wolf et al. | |
| 4,879,108 A | 11/1989 | Yang et al. | |
| 4,882,151 A | 11/1989 | Yang et al. | |
| 4,882,152 A | 11/1989 | Yang et al. | |
| 4,882,153 A | 11/1989 | Yang et al. | |
| 4,882,154 A | 11/1989 | Yang et al. | |
| 4,882,155 A | 11/1989 | Yang et al. | |
| 4,882,156 A | 11/1989 | Yang et al. | |
| 4,882,157 A | 11/1989 | Yang et al. | |
| 4,882,158 A | 11/1989 | Yang et al. | |
| 4,882,159 A | 11/1989 | Yang et al. | |
| 4,882,160 A | 11/1989 | Yang et al. | |
| 4,950,689 A | 8/1990 | Yang et al. | |
| 4,963,359 A | 10/1990 | Haslwanter et al. | |
| 5,071,643 A | 12/1991 | Yu et al. | |
| 5,122,377 A | 6/1992 | Miller et al. | |
| 5,320,848 A | 6/1994 | Geyer et al. | |

(Continued)

FOREIGN PATENT DOCUMENTS

CA    1286533    7/1991

(Continued)

OTHER PUBLICATIONS

Accession No. 1984-111114 [18], "Ice glazing agent for coating fish before freezing—contains gelatin, xanthum gum, polysaccharide, alcohol and malt syrup," English language abstract for Japanese Patent Publication No. JP 59-051734, (1984).

(Continued)

*Primary Examiner*—Collamudi S. Kishore
*Assistant Examiner*—Pili Hawes
(74) *Attorney, Agent, or Firm*—Sterne, Kessler, Goldstein & Fox P.L.L.C.

(57) ABSTRACT

The present invention provides oral delivery systems for functional ingredients, such as drugs, nutritional supplements, botanicals, and vitamins. The delivery systems comprise an ingestible matrix within which the functional ingredient(s) are substantially uniformly and completely dispersed and in which degradation of the functional ingredient(s) is minimised. The matrix comprises 1) one or more carbohydrate; 2) one or more sugar, sugar syrup and/or sugar alcohol; 3) one or more hydrocolloid; 4) one or more polyhydric alcohol; 5) one or more source of mono- or divalent cations, and 5) water. The combination of carbohydrate and hydrocolloid in the matrix ensures that the delivery system readily retains the solvent component and thereby prevents separation of the solvent from other components of the matrix. The invention also provides methods of preparing and using the delivery systems.

33 Claims, 2 Drawing Sheets

U.S. PATENT DOCUMENTS

| | | |
|---|---|---|
| 5,328,711 A | 7/1994 | Coleman et al. |
| 5,397,786 A | 3/1995 | Simone |
| 5,576,316 A | 11/1996 | Cohn |
| 5,616,340 A | 4/1997 | Ells et al. |
| 5,626,896 A | 5/1997 | Moore et al. |
| 5,637,313 A | 6/1997 | Chau et al. |
| 5,648,092 A | 7/1997 | Weckenmann et al. |
| 5,753,255 A | 5/1998 | Chavkin et al. |
| 5,773,473 A | 6/1998 | Green et al. |
| 5,817,323 A * | 10/1998 | Hutchinson et al. ........ 424/439 |
| 5,876,781 A | 3/1999 | Lasdon et al. |
| 5,897,897 A | 4/1999 | Porzio et al. |
| 5,902,606 A | 5/1999 | Wunderlich et al. |
| 5,908,864 A | 6/1999 | Casey |
| 5,925,378 A | 7/1999 | Carnazzo |
| 5,928,664 A | 7/1999 | Yang et al. |
| 5,932,273 A | 8/1999 | Yasui |
| 5,935,634 A | 8/1999 | Gamay et al. |
| 5,968,544 A | 10/1999 | Howard et al. |
| 5,968,900 A | 10/1999 | Greenhaff et al. |
| 5,973,005 A | 10/1999 | D'Amelio, Sr. et al. |
| 6,056,971 A | 5/2000 | Goldman |
| 6,077,524 A | 6/2000 | Bolder et al. |
| 6,077,557 A | 6/2000 | Gordon et al. |
| 6,114,379 A | 9/2000 | Wheelwright et al. |
| 6,136,339 A | 10/2000 | Gardiner |
| 6,153,249 A | 11/2000 | Gamay et al. |
| 6,172,114 B1 | 1/2001 | McCabe |
| 6,242,019 B1 | 6/2001 | Bell et al. |
| 6,258,380 B1 * | 7/2001 | Overholt ..................... 424/456 |
| 6,274,161 B1 | 8/2001 | Howard et al. |
| 6,337,082 B1 | 1/2002 | Fuisz et al. |
| 6,337,091 B1 | 1/2002 | Kim et al. |
| 6,340,473 B1 | 1/2002 | Tanner et al. |
| 6,387,381 B1 | 5/2002 | Christensen |
| 6,391,371 B1 | 5/2002 | Bhatia et al. |
| 6,432,442 B1 | 8/2002 | Buehler et al. |
| 6,432,460 B1 | 8/2002 | Zietlow et al. |
| 6,455,068 B1 | 9/2002 | Licari |
| 6,458,395 B1 | 10/2002 | Emoto |
| 6,482,462 B1 | 11/2002 | De Kezel et al. |
| 6,482,465 B1 | 11/2002 | Cherukuri et al. |
| 6,485,738 B1 | 11/2002 | Huang et al. |
| 6,500,463 B1 | 12/2002 | van Lengerich |
| 6,517,886 B1 | 2/2003 | Chau et al. |
| 6,524,611 B1 | 2/2003 | Howard et al. |
| 6,528,104 B1 | 3/2003 | Jindra et al. |
| 6,531,171 B1 | 3/2003 | Armand et al. |
| 6,555,132 B1 | 4/2003 | Brox et al. |
| 6,576,253 B1 | 6/2003 | Manning et al. |
| 6,582,708 B1 | 6/2003 | Sagel et al. |
| 6,592,926 B1 | 7/2003 | Ong et al. |
| 6,596,334 B1 | 7/2003 | Flickinger et al. |
| 6,602,518 B1 | 8/2003 | Seielstad et al. |
| 6,610,348 B1 | 8/2003 | Beyer et al. |
| 6,627,220 B1 | 9/2003 | Turner et al. |
| 6,645,535 B1 | 11/2003 | Zyck et al. |
| 6,649,191 B1 | 11/2003 | Tester et al. |
| 6,669,977 B1 | 12/2003 | Loh et al. |
| 6,673,380 B1 | 1/2004 | Yang et al. |
| 6,723,358 B1 | 4/2004 | van Lengerich |
| 2001/0036464 A1 | 11/2001 | Christensen |
| 2001/0042936 A1 | 11/2001 | Kessel et al. |
| 2001/0048965 A1 | 12/2001 | Cherukuri |
| 2002/0001611 A1 | 1/2002 | Howard et al. |
| 2002/0058097 A1 | 5/2002 | Beyer et al. |
| 2002/0076478 A1 | 6/2002 | Grazela et al. |
| 2002/0197323 A1 | 12/2002 | Cherukuri et al. |
| 2002/0197357 A1 | 12/2002 | Pfeiffer |
| 2003/0017241 A1 | 1/2003 | Armand et al. |
| 2003/0021881 A1 | 1/2003 | Friedman |
| 2003/0026826 A1 | 2/2003 | Cherukuri et al. |
| 2003/0118695 A1 | 6/2003 | Castenmiller |
| 2003/0138543 A1 | 7/2003 | Bahoshy |
| 2003/0194423 A1 | 10/2003 | Torney et al. |
| 2003/0228347 A1 | 12/2003 | Clark et al. |
| 2003/0228368 A1 | 12/2003 | Wynn et al. |
| 2004/0001873 A1 | 1/2004 | Base et al. |
| 2004/0013732 A1 | 1/2004 | Farber et al. |
| 2004/0013743 A1 | 1/2004 | Jackson |
| 2004/0052852 A1 | 3/2004 | Farber et al. |
| 2005/0208141 A1 | 9/2005 | Farber et al. |

FOREIGN PATENT DOCUMENTS

| | | |
|---|---|---|
| EP | 0 075 443 B1 | 11/1986 |
| EP | 0 336 894 | 10/1989 |
| EP | 0 309 464 | 12/1992 |
| EP | 0 515 864 | 11/1995 |
| EP | 0 704 164 | 4/1996 |
| EP | 0 757 895 | 2/1997 |
| EP | 0 904 784 | 3/1999 |
| EP | 1 074 183 | 2/2001 |
| EP | 1 104 652 | 6/2001 |
| EP | 1 117 304 | 7/2002 |
| EP | 0 966 208 | 3/2003 |
| EP | 1 128 735 | 3/2003 |
| EP | 0 950 402 B1 | 5/2003 |
| EP | 1 003 382 | 9/2003 |
| EP | 1 340 428 | 9/2003 |
| EP | 0 888 067 | 12/2003 |
| GB | 691782 | 5/1953 |
| JP | 57-32221 | 2/1982 |
| JP | 60-83535 | 5/1985 |
| JP | 11-308966 | 11/1999 |
| WO | WO 98/20860 | 5/1998 |
| WO | WO 98/23292 | 6/1998 |
| WO | WO 99/26491 | 6/1999 |
| WO | WO 00/13680 | 3/2000 |
| WO | WO 00/16743 | 3/2000 |
| WO | WO 00/74500 | 12/2000 |
| WO | WO 01/70238 | 9/2001 |
| WO | WO 01/76610 A1 | 10/2001 |
| WO | WO 02/00033 | 1/2002 |
| WO | WO 02/00182 | 1/2002 |
| WO | 0 931 543 B1 | 3/2002 |
| WO | WO 02/41702 | 5/2002 |
| WO | WO 02/067903 | 9/2002 |
| WO | WO 03/026438 | 4/2003 |
| WO | WO 03/026439 | 4/2003 |
| WO | WO 03/026614 | 4/2003 |
| WO | WO 03/061565 A2 | 7/2003 |
| WO | WO 03/090726 | 11/2003 |

OTHER PUBLICATIONS

Accession No. 1993-173388 [21], "Gelatin-free marshmallows—comprise gellan gum as substitute for gelatin, opt. Modified and refined by adding propylene glycol alginate, and sorbitol," English language abstract for Bell, V.L., et al., Research Disclosures 348: No. 085 (1993).

"Preparation of Candy with Starch Base Containing Ascospore Active Lactic Acid Bacteria," English language abstract for Japanese Patent Publication No. JP 60-83535, European Patent Office (1985).

"Preparation of Tablet Confection Containing *Lactobacillus bifidus*," English language abstract for Japanese Patent Publication No. JP 57-32221, European Patent Office (1982).

"Hard Candy Having Sealed *Bacillus bifidus* and Its Production," Patent Abstracts of Japan, English language abstract for Japanese Patent Publication No. JP 11-308966, JPO & Japio (1999).

Dialog File 351, Accession No. 12566349, English language abstract for European Patent Publication No. EP 0 931 543 B1, Derwent Information Ltd. (Mar. 2002).

Allen, Jr., L.V., "Formulations for Pediatric Chewable Gummy Gel Base, pediatric Chocolate Troche Base and Pediatric Chewable Gummy Gels," *International Journal of Pharmaceutical Compounding 1*:106-107, IJPC (Mar./Apr. 1997).

Bell, V.L., et al., "Gelatin-Free Marshmallows," *Research Disclosure No.* 34885, Kenneth Mason Publications Ltd (Apr. 1993).

Bennion, M., *The Science Of Food*, Woods, J., and Shepherd, E., eds., Harper & Row Publishers, San Francisco, CA, pp. 292-293 (1980).

Burg, J.C., "Generating Yummy Gummies," *Food Product Design, Design Elements*, 12 pages, Weeks Publishing Co. (May 1998) available at http://www.foodproductdesign.com/archive/1998/0598DE.html.

Kuntz, L.A., "Sweeteners in Confections" *Food Product Design, Design Elements*, 7 pages, Weeks Publishing Co. (Feb. 1993) available at: http://www.foodproductdesign.com/archive/1993/0293DE.html.

National Dairy Council, "Health-Enhancing Properties of Dairy Ingredients," *Dairy Council Digest 72*:7-12, the National Dairy Council (Mar./Apr. 2001).

Royal Pharmaceutical Society of Great Britain, "Information Sheet 4, Lozenges and Pastilles. Prolonged Medication from Palatable Preparations," 2 pages, Museum of the Royal Pharmaceutical Society of Great Britain (2002).

Schmidl, M.K., and Labuza, T.P., "Medical Foods," *Food Tech 46*:87-96, Institute of Food Technologists (1992).

School of Pharmacy, University of North Carolina at Chapel Hill, Pharmaceuticals Laboratories Homepage (1 page), List of Compounding Exercises (2 pages) and Lozenge and Medication Sticks Exercise (6 pages), available at: http://www.pharmlabs.unc.edu.

"Pharmaceutical Dosage Forms," in *United States Pharmacopeia, 20th Edition*, United States Pharmacopeial Convention, Inc., pp. 1029-1030.

Abstract for Japanese Patent Publication No. JP 59-051734, patented Mar. 26, 1984.

Curriculum Vitae of Dr. Theodore P. Labuza, 47 pages (2003).

Portions of U.S. Patent No. 6,235,318, Lombardy, Jr. et al., patented May 22, 2001, available at: http://www.pharmcast.com/patents.

International Preliminary Examination Report for International Patent Application No. PCT/CA03/00411, European Patent Office, Rijswijk, Netherlands, mailed on Sep. 13, 2004.

International Search Report for International Patent Application No. PCT/CA03/00411, European Patent Office, Rijswijk, Netherlands, mailed on Aug. 7, 2003.

Written Opinion for International Patent Application No. PCT/CA03/00411, European Patent Office, Rijswijk, Netherlands, mailed on Jan. 30, 2004.

deMan, J.M., *Principles of Food Chemistry, Second Edition*, Kluwer Academic Publishers, pp. 25, 26, 447-449, and 469 (1990).

"Softgel Manufacturing Process," CapPlus Technologies Softgel Manufacturing Process, 3 pages, available online at http://www.capplustech.com/softgel_manufacturing_process.htm, accessed Oct. 5, 2005.

Stanley, J.P., "Part Two. Soft Gelatin Capsules," in *The Theory and Practice of Industrial Pharmacy*, Lachman, L., et al., eds., Lea & Febiger, Philadelphia, PA, pp. 398-412 (1986).

*Goodman & Gilman's The Pharmacological Basis of Therapeutics, Tenth Edition*, McGraw Hill Medical Publishing Division, NY, p. 6 (2001).

Handbook of Pharmaceutical Excipients, Fourth Edition, Rowe, R.C., et al., eds., Pharmaceutical Press, London, UK, pp. 521-523 (May 2003).

"Dietary Reference Intakes for Energy, Carbohydrate, Fiber, Fat, Fatty Acids, Cholesterol, Protein, and Amino Acids (Macronutrients)," National Academies Press, pp. 342-347 (2002).

* cited by examiner

DELIVERY SYSTEMS FOR FUNCTIONAL INGREDIENTS

THE FIELD OF THE INVENTION

The present invention pertains to the field of oral delivery systems, in particular to oral delivery systems for functional ingredients.

BACKGROUND OF THE INVENTION

Nutritional and dietary supplements such as multi-vitamins and minerals, botanicals and herbal extracts have grown in popularity, as evidenced by the tremendous growth in the industry involved in their manufacture, production and distribution. Such supplements can be consumed in a variety of ways, the most common being in powder or capsule form.

The consumption of powders suffers from problems such as low solubility or dispersability in water or juice and unpleasant mouthfeel and taste. Many supplements are poorly absorbed into the body and a common approach to this problem is to consume larger doses, which can result in unpleasant side effects including cramping, bloating and flatulence. Thus, a number of different delivery systems have been developed to attempt to improve oral methods of delivering various supplements or active ingredients.

A number of encapsulated formulations have been developed which encapsulate or retain functional ingredients in various glassy, sintered or chewy confectionery-type matrixes. In general, the confectionery serves as a solid continuous matrix for the active ingredient or supplement. The active ingredient is delivered according to the dissolution rate of the confectionery matrix, which confers a solid taste in the mouth. Crushing the confectionery is a solution for the consumer to speed up the release of the active ingredient but this solution may be undesirable as dental problems may arise and/or the release rate of the active ingredient incorporated therein may no longer be optimal. Depending upon the method of manufacturing the confectionery matrix, the active ingredient may suffer from deterioration or damage due to heat and/or mechanical stresses in the manufacturing process. Often, high deterioration rates due to strong processing conditions are compensated for by overdosing of the active ingredient in the confectionery matrix, however, this is a costly method resulting in the wastage of a lot of the active ingredient. The "solid" taste a pressed tablet or glassy matrix may provide in the mouth may also be considered as not very attractive in the context of delivering active ingredients, especially if the product is supposed to be primarily a confectionery.

Liquid-filled boiled sweets are known and may also be used to deliver active ingredients. However, despite the fact the centre is primarily liquid, the whole product has a tendency to melt as one piece in the mouth. The liquid centre does not release from the casing rapidly but rather melts slowly and progressively, thus making a pasty mass.

Powdered sugar filling in a high boiled sweet has also been known for many years in the manufacture of traditional confectioneries such as "Sherbet Lemon" in England. This type of confectionery behaves in the mouth in a way similar to liquid-filled boiled sweets with the casing and filling melting slowly in the mouth and has not been used for delivering active ingredients.

Encapsulation of active ingredients has been described in a number of publications. For example, U.S. Pat. No. 5,897,897 describes the encapsulation of medications, pesticides, vitamins, preservatives or flavouring agents within a glassy matrix consisting of modified starch and a polyhydric alcohol and European Patent EP 0904 784 describes a probiotic preparation with health promoting action comprising bacterial cells, novelose and arabic gum included in a 3-gram proteinic capsule. U.S. Pat. No. 5,648,092 describes pharmaceutical compositions in the form of pleasant-tasting chewable tablets, or chewable coated tablets, which contain at least one rapidly swelling physiologically acceptable gel former plus sugar or sugar substitutes in addition to the pharmaceutically active ingredient sulfacrate.

Similarly, a number of publications describe various means for encapsulating probiotic microorganisms. U.S. Pat. No. 4,396,631, for example, describes a bifidobacterium-containing confectionery tablet including one or more of substances selected from starch, starch hydrolyzate and protein, while Japanese Patent JP 2893021 describes a boiled sweet enclosing bifidobacteria. The bifidobacteria are encapsulated with a protective coating film and diluted with a mixture of powdered sugar or sugar alcohol as a filling. Japanese Patent JP 60083535 describes a preparation of candies containing lactobacilli made by mixing sugar and millet honey, chilling, pulverising and adding activated lactobacilli powder. Japanese Patent JP 57032221 describes candy tablets containing bifidus microorganism made by mixing microorganism powder with fat, adding further raw materials and tabletting. A confectionery composition containing a long-life lactic bacteria, fats and/or oil, fermented milk powder and saccharide is described in European Patent EP 704164 and German Patent DE 19830528 discloses a multi-layer tablet comprising nutritious substances and microorganisms, which can be stored without cooling.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide an oral delivery system for functional ingredients. In accordance with an aspect of the present invention, there is provided an oral delivery system for functional ingredients comprising one or more functional ingredient substantially uniformly dispersed in a matrix, said matrix comprising:

i) a sugar component comprising one or more sugar, sugar syrup, sugar alcohol, or a combination thereof;
ii) one or more carbohydrate;
iii) a hydrocolloid component comprising one or more hydrocolloid;
iv) a solvent component comprising one or more polyhydric alcohol;
v) one or more source of mono- or divalent cations, and
vi) one or more source of water, wherein said delivery system is a semi-solid at room temperature and has a final moisture content of between about 15% and about 30% by weight and a water activity of less than about 0.7.

In accordance with another aspect of the invention, there is provided a method of making an oral delivery system for functional ingredients comprising:

(a) preparing a blend comprising one or more carbohydrate, one or more hydrocolloid, one or more sugar, sugar alcohol or sugar syrup, or a combination thereof, one or more source of mono- or divalent cations, and water;
(b) heating said blend to a temperature of less than 100° C.;
(c) maintaining said blend at a temperature of less than 100° C.;
(d) adjusting the moisture content of the blend to between about 15% and about 30% by weight;
(e) adding to said blend one or more functional ingredient and a solvent component comprising one or more polyhydric alcohols at or below a temperature of 70° C. to form a matrix whereby the one or more functional ingredient is substantially uniformly dispersed throughout said matrix, and
(f) moulding said matrix, wherein the delivery system has a final moisture content between about 15% and about 30% and a water activity of less that about 0.7.

In accordance with another aspect of the invention, there is provided a delivery system for functional ingredients prepared by the above method.

In accordance with still another aspect of the invention, there is provided a use of a delivery system for functional ingredients for oral administration of one or more functional ingredient to an animal in need thereof.

Various objects and advantages of the present invention will become apparent from the detailed description of the invention.

DETAILED DESCRIPTION OF THE INVENTION

Figure 1:
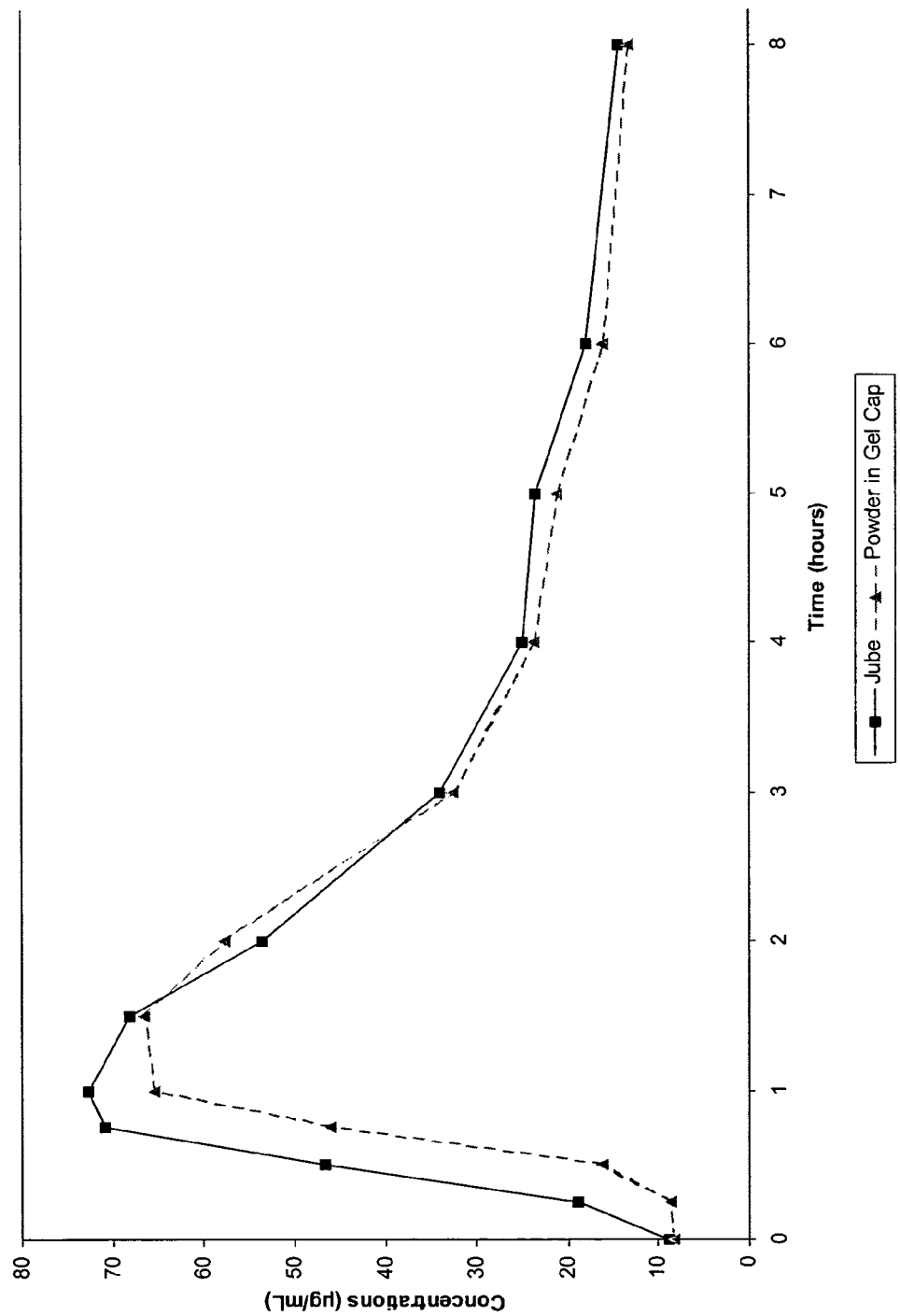
FIG. 1 demonstrates the enhanced uptake of creatine into the blood following administration of jujubes prepared according to Example 4 to humans.

Unless defined otherwise, all technical and scientific terms used herein have the same meaning as commonly understood by one of ordinary skill in the art to which this invention pertains. As used herein, percentage values (%) represent the weight percentages of the total weight of the delivery system.

The term "functional ingredient," as used herein, includes physiologically or pharmacologically active substances intended for use in the treatment, prevention, diagnosis, cure or mitigation of disease or illness, or substances that provide some degree of nutritional or therapeutic benefit to an animal when consumed. The term "functional ingredient" refers more particularly to the ISLI European definition that states that a functional food can be regarded as "functional" if it is satisfactorily demonstrated to affect beneficially one or more target functions in the body, beyond adequate nutritional effects in a way that is either an improved state of health and well-being and/or reduction of risk of disease (Scientific Concept of Functional Foods in Europe: Consensus Document, British Journal of Nutrition, Volume 80, supplement 1, August 1998). Non-limiting examples include drugs, botanical extracts, enzymes, hormones, proteins, polypeptides, antigens, nutritional supplements such as fatty acids, antioxidants, vitamins, minerals, as well as other pharmaceutically or therapeutically useful compounds. The functional ingredients may include ingredients having active effects in dental or medical hygiene, bone health, digestive aid, intestinal protection, general nutrition, stress relief, etc.

The term "drug," as used herein refers to a pharmacologically active substance that exerts a localised or systemic effect or effects on an animal.

The terms "botanical extract" and "botanical," as used interchangeably herein, refer to a substance derived from a plant source. Non-limiting examples may include echinacea, Siberian ginseng, ginko biloba, kola nut, goldenseal, golo kola, schizandra, elderberry, St. Johns Wort, valerian and ephedra.

The term "nutritional supplement" as used herein refers to a substance that exerts a physiological effect on an animal. Typically, nutritional supplements fulfil a specific physiological function or promote the health and well-being of the consumer.

The term "animal" as used herein includes, but is not limited to, mammals including humans, birds and reptiles.

The Delivery System

The delivery systems according to the present invention comprise an ingestible matrix within which one or more functional ingredients are substantially uniformly and completely dispersed and in which degradation of the functional ingredients is minimised or eliminated.

The delivery systems according to the present invention are suitable for administration to both human and non-human animals. One skilled in the art will appreciate that each delivery system can be formulated differently according to the type of animal to which it is to be administered. For example, for administration to an animal such as a cat or a dog, meat or fish-based flavours may be added. For administration to a human, the delivery system may be formulated, for example, as a confectionery using fruit-based or other flavours. The delivery systems are especially suited for oral administration due to their palatability. Additionally, due to the highly portable format, the delivery systems are simple and convenient to administer and to consume for both humans and other animals.

The delivery systems of the present invention can be tailored for specific purposes, thus the delivery systems can be formulated with specific combinations of functional ingredients in order to produce specific physiological effects. For example, a drug delivery system can be formulated to contain certain combinations of drugs or diagnostic agents. Other delivery systems can be formulated with combinations of functional ingredients for example to promote sexual potency, promote endurance, promote cardiovascular health, control fat and/or cholesterol, promote healthy joints, maintain or improve bone density, enhance cellular anti-oxidant capacity, or control appetite. Combinations of ephedra alkaloids and caffeine are known in the art to produce a thermogenic effect and can be included in a thermogenic delivery system. Similarly combinations of Ginkgo biloba and goto kola are used for memory enhancement and can be included in a memory enhancement delivery system. Other non-limiting examples include, delivery systems formulated with combinations of functional ingredients to promote energy, increase endurance, promote weight loss, promote muscle enhancement, improve digestion, or help prevent colds or fight infection.

The delivery systems of the present invention comprise one or more functional ingredients substantially uniformly dispersed within a matrix which comprises 1) one or more carbohydrates that exhibit good moisture binding and low gelatinisation temperature; 2) a sugar component comprising one or more sugars, sugar syrups and/or sugar alcohols; 3) a hydrocolloid component; 4) a solvent component comprising one or more polyhydric alcohols; 5) one or more sources of mono- or divalent cations, and 5) one or more sources of water. The use of one or more carbohydrates and a hydrocolloid component in amounts within the ranges indicated below results in a matrix that readily retains the solvent component and thereby prevents separation of the solvent from other components of the matrix. Additives such as natural or artificial flavourings, colourings, acidulants, buffers and sweeteners can be included in conventional amounts in the matrix.

Due to the substantially uniform and complete dispersion of the functional ingredients within the matrix, the delivery systems are suitable for division into sub-units. For example, if a single unit of a delivery system of the invention is divided into three subunits, each subunit will contain a third of the dose of the original unit. Such division would not be possible with other delivery systems in which the functional ingredients are not evenly dispersed.

The matrix of the delivery systems provides for minimised degradation of the functional ingredients during the preparation of the matrix and the storage of the final delivery systems. The use of relatively low temperatures in the preparation of the matrix, when compared to typical manufacturing procedures for confectioneries, ensures that the functional ingredients are not degraded by excessive heat. In accordance with the present invention, the delivery systems are prepared at a temperature of 100° C. or less. In one embodiment of the present invention, the delivery systems are prepared at or below a temperature of 75° C. In other embodiments, the delivery systems are prepared at or below a temperature of 70° C., and at or below a temperature of 65° C. Low temperatures can be employed in the preparation of the delivery system because the matrix is formulated to remain flowable at temperatures at or above 35° C. In one embodiment of the invention, the matrix remains flowable at or above 45° C.

In addition, the delivery systems maintain a low interaction with water during and after preparation of the matrix, which also contributes to the stability of the functional ingredients dispersed therein. In accordance with the present invention, the final moisture content of the delivery systems is between about 10% and about 30%. In one embodiment, the final moisture content of the delivery systems is between about 11% and about 25%. In other embodiments, the moisture content is between about 13% and about 20%, between about 15% and about 18%, and between about 15% and about 16%.

Furthermore, the delivery systems of the present invention have a low water activity ($a_w$), typically below about 0.7. In one embodiment of the invention, the water activity of the final delivery systems is below about 0.6. In other embodiments, the water activity is below about 0.55, between about 0.45 and about 0.55, between about 0.5 and about 0.55, and between about 0.47 and about 0.52.

In accordance with the present invention, degradation of the functional ingredients during the process of preparing the matrix is less than about 20%. In one embodiment, degradation of the functional ingredients during preparation of the matrix is less than about 15%. In other embodiments, degradation during preparation is less than about 10%, less than about 5%, less than about 2% and less than about 1%.

The matrix also provides for minimised degradation of the functional ingredients dispersed therein during storage of the final delivery systems under normal storage conditions (i.e. at temperatures of 30° C. or below). In accordance with the present invention, therefore, degradation of the functional ingredients during storage of the delivery systems under normal conditions is less than about 20%. In one embodiment, degradation of the functional ingredients during storage is less than about 15%. In other embodiments, degradation during storage is less than about 10%, less than about 5%, less than about 2% and less than about 1%.

The delivery systems of the present invention can be formulated such that the matrix has a final pH in the range of about 2.5 to about 8.5. In one embodiment, the matrix has a final pH of between about 3.0 and about 8.5. Acidic pH is known in the art to promote degradation of certain functional ingredients. For delivery systems formulated to deliver functional ingredients which are sensitive to, or reactive at, acidic pH, therefore, the final pH of the matrix is neutral to mildly basic. By neutral to mildly basic pH it is meant that the final pH is between about 6.0 and about 8.5. In one embodiment of the present invention, the delivery systems are formulated such that the matrix has a final pH between about 6.2 and about 8.5 and thus are suitable for delivery of functional ingredients that are sensitive to, or reactive at, acidic pH. In other embodiments, the final pH of the matrix of the delivery systems is between about 7.0 and about 8.5, and between about 7.1 and about 8.0.

For those functional ingredients that are more stable in acidic form, such as trimethylglycine, or functional ingredients which may react with other components at neutral pH such as glucosamine hydrochloride, the pH of the matrix of the delivery systems may have a final pH below neutral. By below neutral, it is meant that the final pH is between about 2.5 and about 6.0. In another embodiment of the present invention, therefore, the delivery systems are formulated such that the matrix has a final pH between about 3.0 and about 6.0 and thus are suitable for delivery of functional ingredients that are stable at acidic pH and/or interact with other components at neutral pH.

In its final form, the delivery systems of the present invention are semi-solid, intermediate moisture systems, having some properties clearly identified with those of jellies and some properties that are similar to the jujube variety of confectioneries.

The matrix of the delivery systems, therefore, is formulated to be semi-solid at normal room temperature. In the event, however, that the matrix liquefies due to exposure to elevated temperatures, the formulation of the matrix is such that no phase separation of the components occurs and the matrix can be readily re-solidified by cooling (for example, by cooling to temperatures of around 4° C.). The reformed product maintains the substantially uniform dispersion of the functional ingredients contained therein. In one embodiment of the present invention, the delivery systems are formulated such that the matrix is a semi-solid at temperatures at or below about 40° C. In another embodiment, the delivery systems are semi-solid at or below about 35° C. In other embodiments, the delivery systems are semi-solid at or below about 30° C. and at or below about 25° C.

It will be readily apparent to one skilled in the art that new formulations of carbohydrate and hydrocolloid or modifications or substitutes thereof are being developed within the food industry. The present invention therefore contemplates the use of such new formulations to prepare the matrix of the present invention provided that the final properties of the delivery systems are maintained, i.e. substantially uniform and complete dispersion of the functional ingredients, minimisation of the degradation of the functional ingredients and a final moisture content for the delivery systems of between about 10% and about 30% and a water activity below about 0.7. For example, a whey-based polymer has recently been developed that acts as a gelling agent (Dairy Management Inc™). The polymer mimics gelatine functionality and forms strong gels at room temperature that exhibit large deformation without fracture and may be suitable for use in the matrix in accordance with the present invention.

The texture, physical attributes, form and shape of the matrix as described below, can be varied by altering the ratio of ingredients within the given ranges using the methods described herein or by methods familiar to a worker skilled in the art.

One skilled in the art will appreciate that specific selections of the possible components provided below, must be safe for animal consumption. Components for inclusion in the delivery systems are, therefore, substances that are generally regarded as safe (GRAS) and/or meet regulatory standards, such as those of the Codex Alimentarus. Examples falling within the general descriptions provided below that are significantly toxic or cause other types of significant harm to animal health are explicitly excluded from the description of the invention.

1. The Matrix 1.1 Carbohydrate

The carbohydrate component of the matrix typically performs the functions of water binding and gelation and contributes to the overall texture and body of the final delivery system. The carbohydrate contributes to the structural integrity of the matrix and its low set temperature. The carbohydrate can also provide heat stability to the finished product as well as the ability to bind a limited quantity of fats/oils if required.

The carbohydrate to be included in the matrix is selected for its ability to fully hydrate and develop its viscosity in the presence of the other matrix-forming components at a temperature below 100° C. The selected carbohydrate should thus be capable of dispersing without clumping in a sugar syrup or in water, and of becoming fully hydrated with or without heating either in the presence of a sugar syrup or another source of water. While the majority of carbohydrates hydrate upon heating, certain starches, which are commercially available and are known in the art as "cold set" or "pre-gelatinised" starches are capable of hydrating at room temperature and are also suitable for use in the matrix according to the present invention.

In accordance with the present invention, therefore, the selected carbohydrate is capable of hydrating and developing its viscosity at a temperature below 100° C. In one embodiment, the carbohydrate is capable of hydrating at or below 70° C. In another embodiment, the carbohydrate is capable of hydrating at or below 50° C. In other embodiments, the carbohydrate is capable of hydrating at or below 40° C., 35° C. or 25° C.

Furthermore, the selected carbohydrate should allow the final matrix to remain in a free-flowing state at a sufficiently low temperature for addition of the functional ingredients without significant degradation of these compounds. In accordance with the present invention, therefore, the carbohydrate remains free-flowing at or below 100° C. In one embodiment of the present invention, the carbohydrate remains free-flowing between about 35° C. and about 85° C. In another embodiment, the carbohydrate remains free-flowing between about 45° C. and about 70° C.

The viscosity development of the selected carbohydrate should allow for sufficient ease of mechanical handling and pumping during production as well as allowing sufficient time to incorporate all the ingredients and to mould the final product before it sets. As is known in the art, some carbohydrates develop their viscosity upon heating, whereas others develop viscosity upon cooling. Both types of carbohydrates are considered to be suitable for use in the matrix of the present invention. In one embodiment, the selected carbohydrate will develop its viscosity upon cooling. In another embodiment, the viscosity of the carbohydrate will develop completely after deposition or filling.

Carbohydrates that meet the above criteria are known in the art. Examples include cellulose (or vegetable) gums, starches and other amylaceous ingredients that have been modified such that they have a low set temperature. An amylaceous ingredient as used herein refers to a food-stuff that contains a preponderance of starch and/or starch-like material. Examples of amylaceous ingredients include cereal grains and meals or flours obtained upon grinding cereal grains such as corn, oats, wheat, milo, barley, rice, as well as the various milling by-products of these cereal grains such as wheat feed flour, wheat middlings, mixed feed, wheat shorts, wheat red dog, oat groats, hominy feed, and other such material. Other sources of amylaceous ingredients include tuberous foodstuffs, such as potatoes, tapioca, and the like.

Suitable starches are typically modified starches and include those derived from a natural source, such as those obtained from various plant species. Examples of plant sources of starch include, but are not limited to, corn, waxy corn, wheat, rice, tapioca, potato, pea and other sources known in the art. Modified starches are known in the art and the term generally refers to starch that has been physically or chemically altered to improve its functional characteristics. Suitable modified starches include, but are not limited to, pre-gelatinised starches, low viscosity starches (such as dextrins, acid-modified starches, oxidized starches and enzyme modified starches), derivatised starches, stabilised starches (such as starch esters and starch ethers), cross-linked starches, starch sugars (such as glucose syrup, dextrose and isoglucose) and starches that have been submitted to a combination of treatments (such as cross-linking and gelatinisation) and mixtures thereof. The carbohydrate may also be a synthetic starch substitute provided that it meets the criteria outlined herein.

In one embodiment of the present invention, the carbohydrate is a modified starch. In another embodiment, the modified starch is a modified cornstarch. Examples of commercially available modified cornstarches include Soft-Set® and MiraQuick® (A.E. Staley Manufacturing Co.).

Suitable cellulose gums for use in the preparation of the matrix are typically modified cellulose gums. Examples of modified cellulose gums include, for example, methylcellulose (MC), hydroxypropyl methylcellulose (HPMC), ethyl cellulose (EC), hydroxyethyl cellulose (HEC), hydroxypropylcellulose (HPC), hydroxypropyl methylcellulose acetate, hydroxyethyl methylcellulose, hydroxyethylcellulose acetate, hydroxyethyl ethylcellulose and combinations thereof. Such modified celluloses are well known in the food industry, for example, a range of modified celluloses known as Methogel Food Gums are manufactured by Dow Chemical Company. In one embodiment of the present invention, the carbohydrate used in the preparation of the matrix is methylcellulose, hydroxypropyl methylcellulose or a combination thereof.

The use of combinations of modified starches and modified celluloses as the carbohydrate component of the matrix is also contemplated by the present invention as discussed below in Section 1.7.

In accordance with the present invention, the carbohydrate component of the matrix ranges from about 0.6% to about 15% by weight. The selection of the actual amount of carbohydrate from within this range to be included in the matrix will be dependent upon the type of carbohydrate being used and on desired texture of the final product. Determination of this amount is considered to be within the ordinary skills of a worker in the art. Thus, for example, when modified starch is used as the carbohydrate and a delivery system with a final texture similar to gum drop confectionery is desired, the amount of carbohydrate will be between about 9% and about 14%.

In one embodiment of the present invention, the carbohydrate used in the preparation of the matrix is one or more modified starch, which is included in the matrix in a total amount between about 2% and about 15% by weight. In another embodiment, the amount of modified starch included in the matrix is between about 2% and 10%, In other embodiments, the amount of modified starch included in the matrix is between about 2% and about 8%, between about 2% and about 5%, or between about 2% and about 4%.

In still another embodiment of the present invention, the carbohydrate used in the preparation of the matrix is one or more modified cellulose, which is included in the matrix in a total amount between about 0.6% and about 3% by weight. In another embodiment, the amount of modified cellulose included in the matrix is between about 0.6% and 1.5%.

1.2 Sugar Component

Sugar is generally used in a confection primarily for sweetness; however, it is known in the art that sugar can also play an important role in the physical properties of a matrix, such as crystallinity, gel strength, bodying/texture, humectancy, and water activity.

The sugar component of the matrix comprises one or more sugars, sugar syrups, sugar alcohols and/or sugar alcohol solids. Examples include, but are not limited to, sugars such as sucrose, glucose, xylose, ribose, maltose, galactose, dextrose, and fructose; syrups such as corn syrups, hydrogenated glucose syrups, high fructose corn syrups; polydextrose; and sugar alcohols such as isomalt, maltitol, sorbitol, lactitol and mannitol. The latter are also often in the form of syrups. One skilled in the art will appreciate that if a sugar or sugar alcohol solid is used in the matrix, it should be first dissolved, for example, by heating in water or in another syrup, prior to being added to the mixture.

When the sugar used to prepare the matrix is dextrose, it is generally provided in the form of a corn syrup. Corn syrups are prepared by hydrolysis of starch and are characterised by dextrose equivalent (D.E.) values such that they are classified as low, medium or high D.E. syrups, with high D.E. syrups having a high concentration of dextrose and low D.E. syrups having a low concentration of dextrose. In one embodiment of the present invention, the sugar component used in the preparation of the matrix comprises a corn syrup. In another embodiment, the matrix comprises a corn syrup that exhibits a D.E. of between 20 D.E. and 99 D.E. In other embodiments, the matrix comprises a "high" DE corn syrup with a D.E. of between 40 and 70, or with a D.E. of between 62 and 65. In another embodiment, the corn syrup is a high fructose corn syrup.

Various corn syrups are commercially available. For example, 62 D.E. 1600 Corn Syrup (Casco Inc./Canada Starch Operating Co. Inc.), SWEETOSE 4300 corn syrup (a 63 D. E. corn syrup; A. E. Staley Manufacturing Company; Decatur, Ill.) and Clearsweet® 63/43 IX corn syrup (a 63 D. E. corn syrup; Cargill/North America Sweeteners).

Combinations of sugars or sugar syrups are also suitable for use in the preparation of the matrix. Examples of suitable combinations of syrups include, but are not limited to, isomalt syrup and high fructose corn syrup, a high DE corn syrup and high fructose corn syrup and maltitol syrup and high fructose corn syrup.

One skilled in the art will appreciate that the total amount of sugar in the matrix will vary depending upon the combination of sugar sources used. For example, when sugar syrups are used, lower viscosity sugar syrups will produce a matrix with less body and lower rigidity. The total amount of sugar present in the matrix is about 20% to about 60% by weight.

In one embodiment of the present invention, a mixture of sugar syrups is used as the sugar component in a total amount between about 35% and about 55% by weight. In another embodiment, a mixture of sugar syrups is used as the sugar component in a total amount between about 40% and about 50% by weight.

1.3 Hydrocolloid Component

The matrix according to the present invention further comprises one or more hydrocolloid. Hydrocolloids are hydrophilic polymers of vegetable, animal, microbial or synthetic origin, naturally present or added to aqueous foodstuffs for a variety of reasons due to their unique textural, structural and functional properties. In general, they are used for their thickening and/or gelling properties as well as their water binding and organoleptic properties. Hydrocolloids can also be used to improve and/or stabilise the texture of a food product while inhibiting crystallisation.

Examples of hydrocolloids include, but are not limited to, tragacanth, guar gum, acacia gum, karaya gum, locust bean gum, xanthan gum, agar, pectin, gelatine, carageenan, gellan, alginate, or a combination thereof. The use of hydrocolloids is well-known in the art and many hydrocolloids for use in products for human or animal consumption are available commercially, for example, Type B gelatine from Leiner Davis, Kelcogel® Gellan Gum manufactured by CP Kelco and a range of Ticagel® hydrocolloids from TIC Gums.

One skilled in the art will appreciate that the selection of the hydrocolloid to be used in the matrix will depend on the pH of the matrix, the interaction of the hydrocolloid with the carbohydrate component of the matrix and the particular texture and consistency required for the final product. The type of hydrocolloid used will also affect the set temperature of the matrix. For example, the use of a gelatine/gellan mixture or a gelatine/pectin mixture provides a set temperature around 35° C., whereas the use of carageenan or locust bean gum will result in a set temperature closer to 60° C. Thus, the choice of hydrocolloid for use in the matrix is also dependent upon the properties of the functional ingredient(s) to be incorporated into the delivery system. Functional ingredients that are unstable at higher temperatures will require the selection of a hydrocolloid or mixture of hydrocolloids that have a low set temperature, whereas functional ingredients that are more stable can be used with hydrocolloids having a higher set temperature. Selection of an appropriate hydrocolloid is considered to be within the ordinary skills of a worker in the art.

In one embodiment of the present invention, the matrix comprises gelatine. The term "gelatine" refers to a heterogeneous mixture of water-soluble proteins of high average molecular weight derived from the collagen-containing parts of animals, such as skin, bone and ossein by hydrolytic action, usually either acid hydrolysis or alkaline hydrolysis. Different types of gelatine can be prepared by altering the process parameters. Gelatine is defined generally using a "Bloom value" which indicates the strength of the gel formed under certain circumstances using the gelatine. In the preparation of confectionery, when a harder gel is desired, gelatine having a higher Bloom value is used. Conversely, when the final product is required to be more flowing, gelatine having a lower Bloom value is used. One skilled in the art will appreciate that the water holding capacity of gelatine alone is lower than that of a combination of gelatine with another hydrocolloid, such as gellan or pectin, and may necessitate the use of a higher amount of gelatine to achieve the desired gelation/texture of the matrix. When the hydrocolloid in the matrix of the present invention comprises gelatine, the Bloom value (BL) is generally about 100 to 260 BL. In one embodiment, the Bloom value is about 250 BL. In another embodiment, a mixture of gelatines with different Bloom values is used.

As indicated above, gelatine can be combined with one or more other hydrocolloid to impart slightly different characteristics to the matrix. For example, combinations of gelatine with gellan or gelatine with pectin provide a good texture to the matrix. When combinations of gelatine and gellan are used in the preparation of the matrix, the ratio of gelatine:gellan is typically in the range between about 15:1 to about 40:1. These relative amounts provide a cohesive structure to the delivery system. When a combination of gelatine and pectin are used in the preparation of the matrix, the ratio of gelatine:pectin is typically in the range between about 15:1 to about 40:1.

In one embodiment of the present invention, a combination of gelatine and gellan is used in the preparation of the matrix in a gelatine:gellan ratio of about 15:1 to about 35:1. In another embodiment, a combination of gelatine and pectin is used in the preparation of the matrix in a gelatine:pectin ratio of about 15:1 to about 25:1.

The total amount of hydrocolloid incorporated into the matrix is generally between about 0.1% and about 7.0% by weight. In one embodiment, the total amount of hydrocolloid in the matrix is between about 0.5% and about 6.8% by weight. In another embodiment, the total amount is between about 1.0% and about 6.6%. In other embodiments, it is between about 2.0% and about 6.0%, between about 4.0% and about 6.0%, between about 5.0% and about 6.0% and between about 6.0% and about 7.0%.

1.4 Solvent Component

The primary role of the solvent component of the matrix is to dissolve or disperse the creatine and other functional ingredients to allow for substantially uniform and complete incorporation of these ingredients into the matrix. The solvent also provides for improved flow characteristics of the mixture and functions somewhat as a humectant. In accordance with the present invention, the creatine and optional other functional ingredients are added to the solvent component prior to combining with the remaining components of the matrix.

The solvent used in the preparation of the matrix is typically colourless, non-volatile with no strong odour or flavour and is substantially miscible with water and/or alcohols. In accordance with the present invention, the solvent component can be one or more polyhydric alcohol. The term "polyhydric" as used herein means that the compound contains two or more hydroxyl groups. Examples of polyhydric alcohols include, but are not limited to, glycerol and/or its lower alkyl ester derivatives, sorbitol, propylene glycol, and short chain polyalkylene glycols, such as polyethylene glycol, and mixtures thereof. In one embodiment of the present invention, the solvent component comprises glycerol. In another embodiment, the solvent component comprises glycerol and a short chain polyalkylene glycol. In another embodiment, the solvent component comprises glycerol and polyethylene glycol.

One skilled in the art will understand that the amount of the solvent component incorporated into the matrix will be dependent on the solubility of the functional ingredient(s) being incorporated into the delivery system. Typically, the delivery system according to the present invention contains about 5% to about 35% by weight of the solvent component. In one embodiment, the delivery system contains about 20% to about 30% of the solvent component.

1.5 Mono- or Divalent Cations

The matrix also comprises one or more sources of mono- and/or divalent cations in order to allow proper gelation of the matrix. Suitable sources of mono- and divalent cations for incorporation into food products are known in the art and are commercially available. Examples include mono- or divalent salts such as sodium, potassium or calcium chloride or potassium citrate. In one embodiment of the present invention, potassium citrate is added to the matrix as a source of monovalent cations.

When the source of mono- or divalent cations is a mono- or divalent salt, then it is typically added to the matrix in an amount between about 1% and about 5% by weight. In one embodiment it is added in an amount between about 1% and about 3%. In another embodiment, it is added in an amount between about 1.2% and about 2.5%.

1.6 Water

As indicated above, the delivery system according to the present invention has a final moisture content between about 10% and about 30% and a water activity below about 0.7. It will be readily apparent to one skilled in the art that the appropriate amount of water may be provided by one or more of the various components of the system, for example, a sugar syrup, a hydrated starch or a hydrated hydrocolloid, or additional water may need to be added separately. Additional water can be provided alone or as a solution containing other additives, for example, as a buffer solution or as a solution containing a sweetener, flavouring or colouring. The total amount of water from the one or more sources will be sufficient to provide the final delivery system with a moisture content and water activity within the ranges indicated above.

1.7 Other Additives

The matrix can optionally contain other additives such as sweeteners, flavourings, colourings, modified vegetable gums or celluloses, or a combination thereof. It will be readily apparent that additives for inclusion in the matrix should be selected such that they do not affect the properties of the matrix, do not exhibit substantial reactivity with the functional ingredients in the matrix, and are stable during preparation of the matrix.

The sweetener can be selected from a wide variety of suitable materials known in the art. Representative, but non-limiting, examples of sweeteners include xylose, ribose, sucrose, mannose, galactose, fructose, dextrose, maltose, partially hydrolysed starch, lactose, maltodextrins, hydrogenated starch hydrolysate and mixtures thereof. In addition to these sweeteners, polyhydric alcohols such as sorbitol, mannitol, xylitol, and the like may also be incorporated. Alternatively, one or more artificial sweeteners can be used, for example, sucrose derivatives (such as Sucralose), amino acid based sweeteners, dipeptide sweeteners, saccharin and salts thereof, acesulfame salts (such as acesulfame potassium), cyclamates, steviosides, dihydrochalcone compounds, thaumatin (talin), glycyrrhizin, aspartame, neotame, alitame, and mixtures thereof.

When an additional sweetener is used, it can be used in amounts as low as 0.01% by weight. The actual amount of sweetener required will be dependent on the type of sweetener selected and on the desired sweetness of the final product. Amounts of various sweeteners to be added to food products are well known in the art. The total amount of the sugar component, which forms a structural part of the matrix, and additional sweetener(s) in the matrix, however, remains less than 60% by weight.

Suitable flavourings that can be added to the delivery system are known in the art and include, both synthetic flavour oils and oils derived from various sources, such as plants, leaves, flowers, fruits, nuts, and the like.

Representative flavour oils include spearmint oil, peppermint oil, cinnamon oil, and oil of wintergreen (methylsalicylate). Other useful oils include, for example, artificial, natural or synthetic fruit flavors such as citrus oils including lemon, orange, grape, lime and grapefruit, and fruit essences including apple, strawberry, cherry, pineapple, banana, raspberry and others that are familiar to a worker skilled in the art.

The amount of flavouring agent employed is normally a matter of preference subject to such factors as concentration/dilution of the flavour stock, flavour type, base type and strength desired. In general, amounts of about 0.01% to about 5.0% by weight of a final product are useful. In one embodiment of the present invention, a flavouring agent is included in the matrix in amounts of about 0.02% to about 3%. In another embodiment, the flavouring agent is added in amounts of about 0.03% to about 1.5%.

Colourings suitable for use in foodstuffs are well known in the art and can be optionally included in the matrix to add aesthetic appeal. A wide variety of suitable food colourings are available commercially, for example, from Warner Jenkins, St. Louis, Mo. Where a synthetic colouring agent is used in the matrix, the amount ranges from about 0.01% to about 2% by weight. In one embodiment of the present invention, a synthetic colouring agent is added to the matrix in an amount between about 0.03% to about 1% by weight. A worker skilled in the art will appreciate that when a colouring agent derived from a natural source is used in the matrix, an increased amount of the colouring agent is generally required to achieve the same effect as a synthetic colouring agent.

The present invention also contemplates that, when the carbohydrate component of the matrix is a modified starch, that a modified vegetable gum or cellulose may be included in the matrix in order to improve the texture, lubricity and/or elasticity of the matrix. These compounds can be used, for example, to increase the viscosity of the delivery system if it is warmed, thus reducing potential melting and lessening water activity which will help to improve the stability of the system in the event it is left in an excessively hot environment. Examples of modified vegetable gums or celluloses are provided above. The modified vegetable gum or cellulose can be included in the matrix in amounts between about 0.01% and 0.8% by weight. In one embodiment, modified vegetable gum or cellulose is included in the matrix in an amount between about 0.1% and about 0.7%.

2. Functional Ingredients

The delivery systems according to the present invention comprise one or more functional ingredients. The functional ingredients to be incorporated into the delivery system can be drugs, therapeutic and/or diagnostic compounds, nutritional supplements that fulfil a specific physiologic function or promote the health an/or well-being of the consumer, botanicals or herbal extracts, and the like.

A variety of drugs or therapeutic and/or diagnostic compounds are suitable for use with the present delivery system. Representative examples include, but are not limited to, anti-tumour compounds such as tamoxifen, doxyrubicin, taxol, cisplatin; anti-viral compounds such as ddI and ddA, anti-inflammatory compounds such as NSAIDs and steroids; antibiotic compounds such as antifingal and antibacterial compounds; cholesterol lowering drugs, anti-hypertensive drugs, vasoconstrictors, sedatives, antihistamines, decongestants, expectorants, and anti-nauseants and contrast agents for medical diagnostic imaging.

One or more of the functional ingredients included in the delivery system can be a nutritional supplement. Illustrative, but non-limiting, examples of nutritional supplements suitable for use with the delivery system according to the present invention include, probiotic bacteria, prebiotics, vitamins, enzymes, co-enzymes, cofactors, antioxidants, minerals and mineral salts, amino-acids and amino acid derivatives (for example, dimethylglycine), peptides, proteins, gums, carbohydrates, phytochemicals, dextroses, phospholipids, other trace nutrients, oxygenators, brain-stimulating substances, energy providers, metabolic intermediates, hormones, botanical extracts, fatty acids (for example, linoleic acid or conjugated linoleic acid), oat beta-glucan or other functional fibres, carnitine, bicarbonate, citrate, or combinations thereof.

Probiotic microorganisms in the form of live microbial nutritional supplements and which are recognized as conferring a beneficial effect on an animal can be incorporated into the delivery system. Probiotic microorganisms are microorganisms which beneficially affect a host by improving its intestinal microbial balance (see, for example, Fuller, R; 1989; *J. Applied Bacteriology*, 66: 365–378). Beneficial effects of probiotic microorganisms include activation of the immune system, prevention of the bacterial overgrowth by pathogens, prevention of diarrhoea and/or restoration of intestinal flora. Examples of probiotic microorganisms include, but are not limited to, *Bifidobacterium* (such as *Bifidobacterium longum* B129, *Bifidobacterium longum* B128, *Bifidobacterium adolescentis* Bad4, and *Bifidobacterium lactis* Bb12), *Lactobacillus* (such as, *Lactobacillus johnsonii* and *Lactobacillus paracasei*), *Streptococcus* and *Saccharomyces*. Typically, the microorganism is added to the matrix in a spray dried or freeze-dried form.

Many probiotic bacterial strains have been deposited under the Budapest Treaty at the Collection Nationale de Cultures de Microorganismes (CNCM), Institut Pasteur, 28 rue du Docteur Roux, 75724 Paris Cedex 15, France. For example, *Lactobacillus johnsonii* (NCC 533) has been deposited on 30.06.1992 under reference CNCM I-1225, *Lactobacillus paracasei* (NCC 2461) has been deposited on 12.01.1999 under reference CNMC I-2116, *Bifidobacterium longum* (B129) (NCC490) has been deposited on 15.03.1999 under reference CNCM I-2170, *Bifidobacterium longum* (B128) (NCC481) has been deposited on 15.03.1999 under reference CNCM I-2169, and *Bifidobacterium adolescentis* (Bad4) (NCC251) has been deposited on 15.03.1999 under CNCM I-2168. *Bifidobacterium lactis* (Bb12) may be obtained at Hanzen A/S, 10–12 Boege Alle, P.O. Box 407, DK-2970.

The amount of probiotic incorporated into the delivery system will vary according to the specific needs. Typically, the amount of lactic acid bacteria in one unit of the delivery system is between $10^2$ and $10^{12}$ count/gram, for example, between $10^7$ and $10^{11}$ count/gram, or between $10^8$ and $10^{10}$ count/gram.

Prebiotics can be delivered alone or in combination with probiotic bacteria in the delivery system. Prebiotics comprise carbohydrates, generally oligosaccharides, and have the ability to resist hydrolysis by enzymes in the animal digestive tract and thus can reach the colon undegraded to provide a carbohydrate substance particularly suited to growth of probiotic bacteria. Oligosaccharides may be produced from glucose, galactose, xylose, maltose, sucrose, lactose, starch, xylan, hemicellulose, inulin, or a mixture thereof. Purified commercially available products such as fructooligosaccharide contain greater than about 95% solids in the form of oligosaccharides. Prebiotics often comprise a mixture of fructooligosaccharide and inulin, for example, PREBI01® or a mixture of commercially available RAFTILOSE® and RAFTILINE® commercialized by Orafti. A prebiotic of this kind has been demonstrated to improve the response of the immune system.

Other suitable nutritional supplements include vitamins and minerals that the body is usually not capable of synthesizing and which are necessary for ensuring normal growth and/or daily body maintenance. In the context of the present invention, the vitamins can be hydrosoluble or liposoluble vitamins. Examples includes, but are not limited to, Vitamin A (axerophtol or retinol), Vitamin D, Vitamin E (alpha-tocopherol), Vitamin K, Vitamin B and/or PP (niacinamide or nicotinic acid amide) and Vitamin C (L-ascorbic acid). The dosage of vitamins in the delivery system can be adapted to specific needs. In general, one unit of the delivery system may contain a fraction of the recommended daily amount (RDA) of the desired vitamin. For example, assuming a daily consumption of five units of the delivery system, and following European RDA recommendations, Vitamin A can be used up to 160 μg typically between 70 μg and 90 μg a single unit; Vitamin C up to 12 mg typically between 5 mg and 7 mg a single unit; Vitamin E up to 2 mg typically between 0.8 mg and 1.2 mg a single unit; Vitamin D up to 1 μg typically between 0.4 μg and 0.6 μg a single unit; Vitamin B1 up to 0.28 mg typically between 0.12 mg and 0.15 mg a single unit.

Antioxidants can be delivered using the delivery system of the present invention, alone or in combination with other functional agents, such as glutathione, peroxidase, superoxide dismutase, catalase, co-enzyme Q10, honey tocopherols and other tocopherols, lycopenes, beta-carotene or other carotenoids, quertin, rutin, flavonoids, catechins, anthocyanes, eleutherosides and ginsenosides. Some of these antioxidants may be found in significant amounts in plant extracts. Examples include Ginko Biloba leaves that contain Gingko flavanoids, Blueberry fruits that contains anthocyanids, Ginseng roots which contains ginsenosides, Eleutherococcus roots which contains eleutherosides. The biologically active agent may also be a phytochemical such as polyphenol, procyanidin, phenolic acid, catechin or epicatechin, isoflavone, terpene or other phytonutritive plant material.

Suitable minerals include macro-nutrients such as sodium, potassium, calcium, magnesium, phosphorus or oligo-elements such as iron, zinc, copper, selenium, chromium, iodine or a combination thereof. Macro-nutrients are known to play an essential role in complex metabolisms of the body such as in cellular cation exchange, for example, calcium is an essential constituent of the skeleton. Following EU RDA recommendations and assuming, for instance, an average daily consumption of 5 units of the delivery system. Calcium may be used in amounts of up to 160 mg, typically between 60 mg and 90 mg in a single unit.

Trace elements are minerals present in the human body in quantity of usually less than 5 g. An example of a trace element is zinc, which has antioxidant properties, helps in the synthesis of metallothionein, is an essential factor for protein synthesis and helps improve the function of the immune system. Following EU RDA recommendations and assuming a daily consumption of 5 units of the delivery system, zinc may be used in amounts of up to 3 mg per unit, typically between 1.3 mg and 1.7 mg.

Selenium is also an antioxidant and is a co-factor for glutathione peroxidase. Selenium is known to contribute to the integrity of muscles and sperm and also plays a role in hepatic metabolism. Selenium deficiencies may lead to sever cardiac, bone or neuromuscular damage. For example, following the European RDA recommendations and assuming a daily consumption of 5 units of the delivery system, Selenium may be used in amounts of up to 11 μg per unit, typically between 4 μg and 6 μg in humans.

Other nutritional supplements include amino acids, di-peptides or polypeptides or proteins or essential fatty acids. A suitable example of an amino acid is glutamine which provides fuel to gastro-intestinal and immune cells, reduces bacterial translocation and helps prevent muscle loss and improves nitrogen balance. Examples of peptides are the glycopeptides of lactic origin active in inhibiting the adhesion of the bacteria responsible for dental plaque and caries. More particularly, dental and anti-plaque caries agents of this type comprise active principle(s) selected from kappa-caseino-glycopeptides and deacylated derivatives thereof (also known as "CGMP"). Such active principles have an effectiveness on the dental plaque only after a few seconds in the mouth (see, for example, European Patent Number EP283675). Other peptides include phosphopeptides or salts thereof having anticarie properties such as those having from 5 to 30 amino acids including the sequence A-B-C-D-E where, A, B, C, D and E being independently phosphoserine, phosphothreonine, phosphotyrosine, phosphohistidine, glutamate and aspartate and compositions particularly compositions to teeth including same (see, for example, U.S. Pat. No. 5,015,628).

Other examples of polypeptides are cysteine, acetylcysteine, cysteine methionine or a combination thereof. Cysteine and its derivatives are known to aid in defence against oxidative stress and in protein synthesis.

Other nutritional supplements include creatine, caffeine, bee pollen, Royal jelly, chitosan, chondroitin, functional fibres, phospholipids, enzymes known to aid digestion (such as papain, bromelain and lipases), shark cartilage extracts, glucosamine, methylsulponylmethane (MSM), pregnenolone, Brewer's yeast, blue green algae and the like.

The nutritional supplement can be a botanical extract, such as guarana, Gingko biloba, kola nut, goldenseal, Goto kola, schizandra, elderberry, St. John's Wort, valerian and ephedra and ephedra alkaloids, evening primrose oil, beta-sitosterol, cafestol, D-limonene, kabweol, nomilin, oltipraz, sulphoraphane, tangeretin, black tea, white tea, java tea, folic acid, garlic oil, fibre, jojoba, bitter melon, green tea extract, lemon oil, mace, licorice, menthol, onion oil, orange oil, rosemary extract, milk thistle extract, Echinacea, Siberian ginseng or Panax ginseng, lemon balm, Kava Kava, Yerba Mat, bilberry, soy, grapefruit, seaweed, hawthorn, lime blossom, sage, clove, basil, curcumin, taurine, wild oat herb, dandelion, gentian, aloe vera, hops, cinnamon, peppermint, grape chamomile, fennel, marshmallow, ginger, slippery elm, cardamon, coriander, anise, thyme, rehmannia, eucalyptus, menthol, citrus aurantium and schisandra.

Typically, the total amount of functional ingredients constitute less than about 25% by weight of a delivery system. In one embodiment of the present invention, the total amount of functional ingredients constitutes between about 5% and about 20% by weight of a delivery system. In another embodiment, the total amount of functional ingredients constitutes between about 5% and about 20% by weight of a delivery system.

Selection of appropriate functional ingredients for incorporation into the delivery systems for administration to a given animal is considered to be within the ordinary skills of a worker in the art and it is understood that functional agents suitable for administration to humans may differ from those suitable for other animals. Furthermore, it will be apparent that inappropriate combinations of functional agents, for example, those that interact with each other, should not be included in a delivery system.

As indicated above, the present invention provides for delivery systems containing specific combinations of functional ingredients. A wide variety of such combinations of functional ingredients are known in the art for providing specific physiological benefits and are suitable for inclusion in a delivery system of the invention. Non-limiting examples are provided in Table 1.

Functional ingredients are incorporated into the delivery system at levels sufficient to affect the structure or function of the body when taken regularly. Such levels are known in the art or can readily be determined by a skilled technician. It is understood that the total daily intake may be based on administration of one unit of the delivery system, or it may be based on administration of more than one unit. The amount of functional ingredients in the final product will thus vary depending on the format of the units and the number to be administered daily.

Process for Preparing the Delivery System

In accordance with the present invention, the delivery systems remain flowable at temperatures below 100° C. to allow for full dispersion and incorporation of the functional ingredients into the matrix while minimising or preventing degradation of these compounds. Thus, although the actual methodology used to prepare the delivery systems may vary depending on the individual components selected to make up the matrix, the process of preparing the matrix comprises the step of incorporating the functional ingredient(s) into the matrix at temperatures below 100° C. Various standard methods known in the confectionery manufacturing industry can be used to prepare the delivery systems and selection of the appropriate method is considered to be within the ordinary skills of a worker in the art. Batch processes, such as kettle cooking, as well as continuous processes, such as direct stream injection jet cookers and indirect stream tubular heat exchangers, are suitable for preparing the delivery system.

The following description represents a general method of preparing a delivery system of the present invention.

Briefly, a blend of the carbohydrate, hydrated hydrocolloid and the sugar component is prepared. This blend is heated to a temperature of less than 100° C., for example between 65° C. and 80° C., such that all ingredients are dissolved and the desired moisture content is achieved (i.e. 10%–30%). The temperature of the mixture is then reduced to between 50° C. and 80° C.

The functional ingredient(s) are dispersed or dissolved in solvent at or below 70° C., for example below 50° C. This preparation is added to the carbohydrate, hydrocolloid and sugar mixture prepared as indicated above. One or more sources of mono- or divalent cation can also be added at this time. Flavourings and colourings may optionally be added after this step. The pH of the matrix can then be adjusted, if necessary, to a desired final value. One skilled in the art will appreciate that the pH of the delivery systems can range from an upper end of alkalinity to a lower end of acidity that is selected based on taste perception and physiological acceptability and on the ability to support the stability of the particular functional ingredient(s) being incorporated into the delivery system. Suitable methods of adjusting the pH of food products are known in the art and include, for example, the addition of buffers, acids or bases, such as citric acid, sodium citrate, phosphates, sodium hydroxide or potassium hydroxide. As indicated above, the final product has a moisture level between 10% and 30%, for example between 15% and 20%, and a water activity of less than 0.7.

Once the matrix has been prepared as described above, it can then be moulded, for example, using the standard Mogul process or by injection-filling of pre-formed moulds. One skilled in the art will appreciate that the matrix can also be readily adapted to extrusion methods.

In final form, the delivery systems of the present invention are semi-solid, intermediate moisture systems, having some properties clearly identified with those of jellies and some properties that are similar to the jujube variety of confectioneries. The matrix of the delivery systems is thus formulated to be semi-solid at normal room temperature (i.e. at temperatures between about 20° C. and about 30° C.). It will be readily apparent that depending on the particular components selected for use in the preparation of the matrix, the amount of each to be included in the matrix may need to be manipulated within the ranges indicated in order to achieve a semi-solid, intermediate moisture product. One skilled in the art of confectionery design can readily determine which component(s) will need to be adjusted in order to achieve an end-product with these physical properties.

Similarly, it will be readily apparent to one skilled in the art that variations can be made to the described process dependent on the type and the actual amount of each component used (within the given ranges) in order to obtain an end product with the described properties. For example, if the carbohydrate component is a starch, it is known in the art that the gelatinisation temperature of the starch may be affected when certain sugars and sugar alcohols are used. If required, therefore, starch, hydrated hydrocolloid and the sugar component can be heated above 100° C. to allow full gelatinisation of the starch to occur and the desired moisture content to be reached. The temperature of the mixture can then be reduced to between 50° C. and 80° C. prior to addition of the functional ingredient(s) and optionally flavourings and colourings.

As is known in the art, modified celluloses, such as methylcellulose and hydroxypropyl methylcellulose, have unique properties resulting in the ability to delay hydration of these carbohydrates during preparation processes. Thus, when these compounds are used a "delayed hydration technique" may be employed in which the cellulose is first dispersed in the solvent component of the matrix and then mixed with the other components in aqueous solution. The hydration of the cellulose then takes place gradually as the processing is complete and the moulded matrix cools. Delayed hydration and non-aqueous fluid carrier techniques using modified celluloses are standard in the art.

Similarly, the choice of hydrocolloid can affect the set up temperature of the matrix. The use of a combination of gelatine and gellan, such as a gelatine:gellan ratio of between about 20:1 and about 40:1, as the hydrocolloid, for example, results in a matrix set-up temperature of about 35° C., as does a combination of gelatine and pectin at a ratio between about 15:1 and about 25:1. In contrast, the use of other hydrocolloids or combinations of other hydrocolloids with or without gelatine or gellan, alters the set up temperature of the matrix. For example, the use of locust bean gum or carageenan results in set up temperatures of around 60° C. The choice of hydrocolloid is thus dependent on the functional ingredient(s) to be incorporated into the matrix. Temperature sensitive functional ingredients will require a hydrocolloid or hydrocolloid mixture that provides a low set up temperature (such as the gelatine:gellan mixture described above), whereas other hydrocolloids or mixtures thereof can be used with functional ingredients that can tolerate higher temperatures.

The manner in which the individual components are combined may also be varied although typically at least one of the functional ingredient is dispersed in solvent prior to addition to the remainder of the components. For example, the hydrocolloid and part of the sugar component can be mixed and heated prior to being blended with the carbohydrate and remainder of the sugar component. Alternatively, the carbohydrate and the sugar component can be mixed and heated prior to addition of the hydrated hydrocolloid, or the carbohydrate maybe added to the solvent component and then blended with the hydrocolloid and sugar component. These and other variations are considered to be within the scope of the present invention.

In one embodiment of the present invention, the matrix is prepared using (a) modified starch; (b) gelatine:gellan as the hydrocolloid; (c) a mixture of corn syrup and high fructose corn syrup as the sugar component, (d) a mixture of glycerol and propylene glycol as the solvent component, (e) potassium citrate as a source of monovalent cations, and (f) water. The process comprises blending the glycerol and propylene glycol, adding the functional ingredient(s) and warming the resulting blend to 65–70° C. The fructose syrup is blended with water and warmed to 60° C. The gelatine is blended with the gellan, added to the fructose syrup with constant agitation and the temperature is raised to 75° C. in order to dissolve all the components. The corn syrup is warmed to 30–35° C. and the starch and potassium citrate, and optionally other sweeteners, are blended in. The gelatine:gellan blend and the starch blend are then combined and the solution is maintained at 75–80° C. in order to reduce the moisture content to the desired solids content level. The solids content can be measured using standard techniques, such as measurement of the refractive index to estimate production moisture level. Once the desired level has been achieved, the functional ingredient/solvent blend is added, together with any desired colouring and flavouring. The resulting matrix is then moulded using standard procedures.

In another embodiment of the present invention, a matrix containing the same components as indicated above is prepared by the following process. Glycerol and propylene glycol are blended together, the functional ingredient(s) is added and the resulting solution is blended and warmed to 40° C.–60° C. The corn and fructose syrups are blended with water and heated. The dry ingredients are blended and combined with the warmed syrups. The mixture is then heated to at least 80° C. In an alternative embodiment, the blended dry ingredients are blended in with simultaneous live steam injection to reach at least 80° C. The solid content is then adjusted by addition of water to provide a final moisture content of 10% to 30%. The temperature of the syrup mixture is lowered to between 50° C. and 80° C. and the functional ingredient/solvent blend is incorporated. Finally, colouring and flavouring is added, if desired. The matrix is then injection filled into preformed packaging.

In a further embodiment of the present invention, the matrix is prepared using (a) modified starch; (b) gelatine: pectin as the hydrocolloid; (c) a mixture of maltitol syrup and high fructose corn syrup as the sugar component, (d) a mixture glycerol and propylene glycol as the solvent component, (e) potassium citrate as a source of monovalent cations, and (f) water. The process comprises blending the solvents, adding the functional ingredients and warming the mixture to 60° C.–70° C. The starch, gelatine and pectin are blended together with any additional sweeteners required. This blend is added to the syrups with constant agitation and the temperature is maintained at 60° C.–70° C. until the moisture content reaches the desired level. Colouring or flavouring is then added, if desired, and the resulting matrix is moulded using standard techniques.

Testing the Delivery System

1. Physical Properties

One skilled in the art will appreciate that molecular interaction between one or more of the functional ingredient and the matrix may affect the physical attributes of the final product. As is standard in the art, therefore, a sample of the delivery system incorporating the desired functional ingredient(s) can be prepared prior to large-scale production and tested in order to determine whether the matrix retains the desired physical properties, i.e. that the functional ingredients are substantially uniformly dispersed, that degradation of these compounds during the preparation of the matrix is below 20% and that the water activity of the delivery system is below 0.7.

For example, dispersion of the functional ingredient(s) in each delivery system can be determined by dividing a single unit of the final delivery system into several subunits and analysing the content of functional ingredient(s) in each subunit, for example as a % by weight. The levels of functional ingredients can readily be measured by standard analytical techniques such as mass spectrometry, UV or IR spectrometry, or chromatographic techniques, such as gas chromatography or high-performance liquid chromatography (HPLC). If the % by weight of functional ingredient in each subunit is similar, then the functional ingredient is said to be substantially uniformly dispersed throughout the product. One skilled in the art will appreciate that the % by weight need not be identical for each subunit to indicate substantially uniform dispersion. In accordance with the present invention, the % by weight of functional ingredient for each subunit of the final delivery system varies by less than 2%. In one embodiment, the % by weight of functional ingredient for each subunit of the final delivery system varies by less than 1.5%. In other embodiments, the % by weight of functional ingredient for each subunit varies by less than 1% and by less than 0.5%.

Similarly, the degradation of the functional ingredients can be determined by standard analytical techniques taking into account the total amount of each compound included in the preparation of the matrix. Many functional ingredients degrade to yield specific breakdown products, the presence or absence of which can be determined in the final product. As an example, the functional ingredient creatine is hydrolysed to creatinine, which can be distinguished from creatine using chromatographic techniques, such as HPLC. As indicated above, the degradation of the functional ingredients is minimised during the preparation of the delivery system and is less than about 20% in the final product.

The water activity ($a_w$) of the final product can also be analysed by standard techniques. The $a_w$ of a food product is a physical property that has direct implications on the microbial safety of the product and influences storage stability. Lower $a_w$ values generally indicate a food product that is more stable and more resistant to microbial contamination than one with a high $a_w$ value due to the requirement for water of most microbes and the fact that most deteriorative processes in food products are mediated by water. As is known in the art, the $a_w$ value of a food product is the ratio of the water vapour pressure of the product (p) to that of pure water ($p_o$) at the same temperature, i.e. $a_w=p/p_o$. In accordance with the present invention, the water activity of the final delivery system is less than about 0.7.

Other parameters, such as the release rate of the functional ingredients from a delivery system can also be tested by standard methods (for example, the USP Basket Method or Paddle Method; see U.S. Pharmacopoeia XXII (1990)). Typically, a sample of the delivery system containing a known amount of functional ingredient(s) (for example, a unit dose) is placed in an aqueous solution of a predetermined pH, for example around pH 1.2 to simulate stomach conditions and/or around pH 7.4 to simulate colon conditions. The suspension may or may not be stirred. Samples of the aqueous solution are removed at predetermined time intervals and are assayed for their content of the bioactive by standard analytical techniques, such as those indicated above.

In addition, the delivery system may undergo testing to evaluate such factors as the microbial content of the product and the shelf-life of the product. Such quality control testing is standard in the art and can be conducted using known methods.

For example, microbial analysis of the delivery system can be conducted using techniques approved by the appropriate regulatory board, such as those described in "The Compendium of Analytical Methods: HPB Methods for the Microbiological Analysis of Foods" issued by the Health Products and Food Branch of Health Canada.

Shelf life is typically evaluated using accelerated shelf life tests in which the stability of the system and the degradation of the functional ingredients contained therein is analysed under conditions that are known to accelerate the degradation of food products and can be correlated to the stability of the product under normal storage conditions.

Palatability can also be tested using standard techniques. Methods of evaluating the organoleptic properties of foods are well-known in the art. For example, sensory evaluations can be performed using individuals who are spatially separated from each other, for example, in individual partitioned booths, as testers and a hedonic nine-point scale that ranges from 1 (most disliked) to 9 (most liked), with 5 indicating no preference [Larmond, *Laboratory methods for Sensory Evaluation of Foods*, Research branch of Agriculture Canada (1977)]. Odour and taste are generally evaluated under a red light, which masks any differences in the colour of the product. Another nine-point hedonic scale test can be carried out under normal light to evaluate the acceptability of the appearance of the product.

2. Efficacy

The various delivery systems of the present invention can be tested for efficacy in vivo. Typically, the efficacy is tested by conducting bioavailability studies using standard techniques in the pharmaceutical art, such as peak plasma levels and pharmokinetic analyses (see, for example, Enna, et al., *Current Protocols in Pharmacology*, J. Wiley & Sons, New York, N.Y.).

Bioavailability studies are usually conducted by administering to groups of subjects various doses of the delivery system under study over a pre-determined period of time and comparing plasma levels of the functional ingredients in these groups at varying intervals with an appropriate control or controls. Appropriate controls include groups of subjects taking recommended doses of competitor's products. The subjects may or may not have fasted prior to administration of the doses of the delivery system. Single dose or multiple dose studies may be conducted. The studies can also be used to monitor any side-effects of the dosing regimens of the delivery system under investigation by compiling reports of any adverse effects encountered during the course of the study and comparing them to side-effects reported by the control group(s). Optimal dosing schedules can also be determined in this manner.

Studies to determine that the combination of functional ingredients in a delivery system bring about the desired effect in a subject can also be conducted in a similar manner to the bioavailability studies indicated above. Such studies are routine in the art and can be readily designed and conducted by a skilled technician. End effects are measured dependent on the type of effect the delivery system is intended to bring about. For example, for weight loss or thermogenic delivery systems, the body weight and/or body fat percentage of individual subjects to whom varying doses of the delivery system is being administered can be monitored over a period of time and compared to that of individuals in control groups, for example, placebo groups or groups taking competitor's products. For muscle enhancement delivery systems, criteria such as percentage increase in muscle mass can be monitored, for bone health formulations, criteria such as bone density can be monitored. Other factors and end effects that can be monitored for various formulations will be readily apparent to one skilled in the art.

In addition, for certain specific functional ingredients, characteristic metabolic products can be analysed. For example, the effect of creatine on muscle phospho-creatine can be measured by performing muscle biopsy on individuals following a controlled dosing regimen. Extraction and measurement of phosphorus compounds from the biopsy using standard techniques is then conducted to determine changes in muscle phosphor-creatine. Non-invasive measurements, for example, using 3 P-NMR to measure changes in phosphorus compounds can also be utilized. The total concentration of creatinine can also be measured after 24 hours in order to examine clearance of creatine.

Format of the Delivery System

The present invention contemplates various formats for the delivery systems. For example, the delivery systems may be in the form of a confectionery, such as a jujube, in which case it may be formulated alone or it may further comprise a coating, such as a chocolate or yoghurt coating. Preparation of jujube or jelly type confectionery products are known in the art and include, for example, the use of moulds, injection-filling of preformed packages and extrusion processes. It will be readily apparent to one skilled in the art that such standard techniques can be applied to prepare a wide variety of different shaped confectioneries.

For example, a variety of differently shaped moulds or pre-formed packages may be used. Jelly candies such as imitation fruit pieces, fruit bars, and sugared jellies are typical. These confections have a firm, but soft, texture that contributes to their desirable mouth feel. Jelly candies are typically manufactured by the Mogul system in which starch moulds are formed by making a plurality of depressions of the desired shape in a bed of starch. In the Mogul system, the ingredients are blended at the appropriate temperature and then the liquid mixture is deposited into the starch mould, which forms the confection and helps to reduce the moisture content. The deposited confections are typically dried for about 24–72 hours to reach the desired moisture content of about 10% to 30% by weight. Jelly candies can also be manufactured by injection-filling packages pre-formed into an appropriate size and shape with the liquid mixture and allowing the mixture to set up.

Alternatively, the delivery system can be formed as confectionery products by an extrusion process in which the matrix mass is forced at relatively low pressure through a die which confers on the matrix the desired shape and then the resultant extrudate is cut off at an appropriate position to yield products of the desired weight.

For example, the matrix can be forced through a die of relatively small cross-section to form a ribbon, which is carried on a belt under a guillotine-type cutter which cuts the moving ribbon into pieces of equivalent weight and dimensions. Alternatively, the mass may also be extruded as a sheet, which is then cut with a stamp or cookie type cutter into appropriate shapes. After moulding or shaping, the delivery system confectionery product is moved by a conveyor to an area where it may be further processed or simply packaged.

Methods of making and applying coatings to confectionery products are also well-known in the art. Coatings are in general compound coatings the major ingredients of which are sugar and fat. Flavours and colours are often added. Chocolate coatings are usually based on cocoa butter whereas yoghurt coatings typically comprise powdered yoghurt. In general, the coating material comprises a fat that is solid at room temperature, but liquid at temperatures in excess of, for example, 35° C., together with other materials that confer appropriate organoleptic attributes on the final coating. Typically, application of the coating to the confection takes place while the coating is molten, for example, by passing the formed confection simultaneously through a falling curtain of liquid coating and over a plate or rollers which permit coating to be applied to the under surface of the confection. Excess coating is blown off by means of air jets and the coated confection passes through a cooling tunnel where refrigerated air currents solidify the applied coating. In accordance with the present invention, the properties and method of application of the coating must not interfere with, or compromise, the properties of the delivery system. For example, the application of the coating must not require elevated temperatures that would affect the stability of the functional ingredient(s) incorporated into the delivery system.

The present invention further contemplates the delivery system as a filling or a coating, for example, for baked goods such as wafers or cookies. For example, the matrix can be used as a layer between two wafers, or a jelly layer on the top of a cookie or sponge, in which case the product may be further coated with a chocolate or other flavoured coating, if desired, as described above for confectionery products. Alternatively, the matrix may be used to fill doughnut type baked goods. Methods of filling and coating baked goods are also well known in the art.

Administration

The organoleptic properties of the delivery systems of the present invention ensure that they are easy to take and/or to administer. In one embodiment, the delivery systems are formulated for administration to humans and thus contain flavours that would appeal to humans, such as fruit-based flavours. Delivery systems of the present invention that are formulated with confectionery-like qualities and flavours are also appealing to children who are often resistant to taking medications or supplements due to unpleasant tastes or mouthfeel. Thus, in another embodiment, the delivery systems provide a means of easily administrating certain functional ingredients, such as multi-vitamins and minerals, to children.

In another embodiment, the delivery systems are formulated for administration to a non-human animal. In a related embodiment the non-human animal is a domestic animal, such as a dog or a cat. Administration of functional ingredients to an animal in conventional solid dosage forms, such as tablets and capsules, can be problematic in that the animal often expels them, and multiple dosing is often difficult because the animal learns to resist the dosing procedure. It will be readily apparent that the delivery systems of the present invention, which is formulated as a foodstuff, is ideally suited for administration of functional ingredients to animals. When formulated for this purpose, the matrix may contain flavours that more typically appeal to non-human animals, for example, fish or meat flavours. Additional functional ingredients more suited to animal use, such as dessicated liver, may also be included.

Kits

The present invention additionally provides for kits containing a delivery system for administration to a human or non-human animal. The kit would provide an appropriate dosing regimen for a prescribed period for the functional ingredients contained in the delivery system.

The kits of the invention comprise one or more packages containing the delivery system in combination with a set of instructions, generally written instructions, relating to the use and dosage of the functional ingredients contained in the delivery system. The instructions typically include information as to the appropriate dosage and dosing schedule for the functional ingredients in terms of units of the delivery system. The packages containing the delivery system may in the form of unit doses, bulk packages (for example, multi-dose packages) or sub-unit doses. The doses may be packaged in a format such that each dose is associated, for example, with a day of the week. There may also be associated with the kit a notice in the form prescribed by a governmental agency regulating the manufacture, use or sale of biological products, which notice reflects approval by the agency of manufacture, use or sale for human or animal administration.

To gain a better understanding of the invention described herein, the following examples are set forth. It should be understood that these examples are for illustrative purposes only. Therefore, they should not limit the scope of this invention in any way. All percentages throughout the specification and claims are by weight of the final delivery system unless otherwise indicated.

EXAMPLES

Example 1

Delivery System for Creatine and Dimethylglycine

One example of a delivery system containing creatine and dimethylglycine is as follows:

| Ingredient | % by Weight |
| --- | --- |
| Glycerol | 14.57% |
| Propylene Glycol | 5.30% |
| Creatine monohydrate | 11.71% |
| Corn Syrup 62DE | 31.79% |
| Sucralose | 0.04% |
| Modified Starch (Staley Softset ®) | 2.65% |
| Potassium citrate | 2.15% |
| Dimethylglycine | 1.67% |
| High fructose corn syrup | 9.27% |
| Water | 14.57% |
| Gelatine 100 bloom type B | 1.32% |
| Gelatine 250 bloom type A | 3.97% |
| Gellan (Kelcogel ® LT100) CP Kelco | 0.32% |
| Colour | 0.21% |
| Flavour | 0.45% |
| Total: | 100.00% |

Glycerol and propylene glycol were first blended and the creatine was added. The blend was heated to 65–70° C. In a separate container, the two types of gelatine and the gellan were blended together. The fructose syrup and water were mixed and heated to 60° C., after which the gelatine:gellan mixture was added with constant agitation. The mixture was then heated to 75° C. to allow the components to dissolve. In a third container, the corn syrup was warmed to 30–35° C. and the sucralose, potassium citrate, dimethylglycine and starch were then blended in. The corn syrup mixture was combined with the gelatine:gellan mixture and heated to 75–80° C. until the moisture content was reduced and the desired solids level achieved. The creatine mixture was then added together with the colour and flavour additives. The delivery system was then moulded using standard techniques.

Example 2

Heart Health Delivery System

One example of a delivery system for a formulation to promote heart health is as follows:

| Ingredient | % by Weight |
| --- | --- |
| Glycerol | 12.57% |
| Propylene Glycol | 4.19% |
| Arginine | 14.02% |
| Maltitol solution | 33.52% |
| Modified Starch (Staley Miraquick ®) | 2.79% |
| Potassium citrate | 1.17% |
| Sucralose | 0.04% |
| High fructose corn syrup | 9.78% |
| Water | 15.37% |
| Gelatine 250 bloom type A | 5.59% |
| Gellan (Kelcogel ® LT100) CP Kelco | 0.28% |
| Colour | 0.168% |
| Flavour | 0.503% |
| Total: | 100.00% |

Glycerol and propylene glycol were first blended and the arginine was added. The blend was heated to 65–70° C. In a separate container, the gelatine and the gellan were blended together. The fructose syrup and water were mixed and heated to 60° C., after which the gelatine:gellan mixture was added with constant agitation. The mixture was then heated to 75° C. to allow the components to dissolve. In a third container, the maltitol solution was warmed to 30–35° C. and the sucralose, potassium citrate and starch were then blended in. The maltitol mixture was combined with the gelatine:gellan mixture and heated to 75–80° C. until the moisture content was reduced and the desired solids level achieved. The arginine mixture was then added together with the colour and flavour additives. The delivery system was then moulded using standard techniques.

Example 3

Energy Delivery System

An example of a delivery system containing a formulation of functional ingredients to promote energy is as follows:

| Ingredient | % by Weight |
| --- | --- |
| Glycerol | 13.82% |
| Propylene Glycol | 5.53% |
| Creatine monohydrate (CM) | 4.59% |
| Conjugated Linoleic Acid (CLA) | 4.59% |
| Lecithin | 1.05% |
| Isomalt syrup | 33.17% |
| Sucralose | 0.055% |
| Modified Starch (Staley Softset ®) | 2.76% |
| Potassium citrate | 2.24% |
| N,N, dimethylglycine (dmg) | 0.47% |
| Rhodiola/Seabuckthorn extract solution | 0.21% |
| Chromium chelate | 0.11% |
| High Fructose Corn syrup | 9.68% |
| Water | 15.20% |
| Gelatine 250 bloom type A | 5.53% |
| Gellan (Kelcogel ® LT100) CP Kelco | 0.33% |
| Colour | 0.08% |
| Flavour | 0.08% |
| Total: | 100.00% |

The CLA, creatine and lecithin were first mixed together. The glycerol and propylene glycol were mixed and heated to 65–70° C. The CLA/creatine/lecithin blend was then added to the solvents and the resultant mixture was maintained at 65–70° C. In another container, the gelatine was mixed with the gellan. The fructose syrup and water were combined and heated to 60° C. and the gelatine:gellan mixture was then added, after which the temperature was raised to 75° C. and maintained at this temperature until the solids dissolved. In another container, the isomalt syrup was warmed to 30–35° C. and the sucralose, citrate, dmg, rhodiola/seabuckthorn extract, chromium chelate and starch were then blended in. This mixture was combined with the gelatine mixture and the temperature maintained at 75–80° C. until the moisture content was reduced sufficiently to give the desired solids level. Once the proper moisture level was achieved, the glycerol-glycol mixture was blended in together with colour and flavouring additives. The mixture was then moulded using standard techniques.

Example 4

Delivery System for Creatine

One example of a delivery system for creatine is as follows:

| Ingredient | % by Weight |
|---|---|
| Glycerol | 27.9990% |
| Propylene Glycol | 3.4145% |
| Potassium Hydroxide | 0.1208% |
| Creatine Monohydrate | 24.0154% |
| High Fructose Corn Syrup | 15.7068% |
| Corn syrup | 14.7962% |
| Starch (Mira-quik MGL ™) | 2.5040% |
| Water | 3.9836% |
| Potassium phosphate | 0.4234% |
| Sucralose | 0.0381% |
| Potassium citrate | 0.9526% |
| Gelatine Type A | 4.7803% |
| Pectin | 0.2732% |
| Flavour | 0.5464% |
| Colour | 0.2982% |
| Total: | 100.0000% |

Glycerol and propylene glycol were first blended and the creatine was added. The blend was heated to 45–50° C. In a separate container, the gelatine, pectin, starch and sucralose were blended together. The fructose and glucose syrups and water were mixed and heated to 60° C., after which the salts and pH modifying agents were added with constant agitation and heated to 60–70° C. to dissolve the solids. The powder blend was then incorporated into the syrup mixture using high shear. Finally, the creatine mixture was added, together with the colour and flavour additives, and blended. The delivery system was then moulded using standard techniques.

Example 5

Weight Loss or Maintenance Delivery System

An example of a delivery system containing a combination of functional ingredients to aid in weight loss or maintenance is as follows:

| Ingredient | % by Weight |
|---|---|
| Glycerol | 16.67% |
| Propylene Glycol | 7.86% |
| Conjugated linoleic acid-Clarinol 80 | 7.86% |
| Citrus Aurantium | 0.50% |
| Maltitol syrup | 35.86% |
| High fructose corn syrup | 15.73% |
| Sucralose | 0.06% |
| Modified Starch (Staley Miraquick ®) | 3.15% |
| Potassium citrate | 1.42% |
| Potassium hydroxide | 0.92% |
| Inulin | 0.63% |
| Caffeine | 0.25% |
| Mixed tocopherols | 0.04% |
| Ascorbic acid | 0.03% |
| Water | 1.38% |
| Gelatine | 6.29% |
| Pectin | 0.31% |
| Colour | 0.3% |
| Flavour | 0.74% |
| Total: | 100.00% |

The glycerol and propylene glycol were first blended together. The CLA, Citrus Aurantium and mixed tocopherols were then added and the resultant mixture was warmed to 60–70° C. In another container, the syrups, water, potassium citrate and potassium hydroxide were combined and warmed to 60–70° C. The starch, gelatine, pectin, inulin and sucralose were pre-blended then added to the syrup mixture under high shear. This mixture was combined with the glycerol mixture and the temperature maintained at 60–70° C. until the moisture content was reduced sufficiently to give the desired solids level. Colour and flavour were added and the mixture was then moulded using standard techniques.

Example 6

Delivery System for Creatine

Another example of a delivery system containing creatine is as follows:

| Ingredient | % by Weight |
|---|---|
| Glycerol | 14.82% |
| Propylene Glycol | 5.39% |
| Creatine monohydrate | 11.91% |
| Corn Syrup 62DE | 32.33% |
| Sucralose | 0.04% |
| Modified Starch (Staley Softset ®) | 2.70% |
| Potassium citrate | 2.19% |
| High fructose corn syrup | 9.43% |
| Water | 14.82% |
| Gelatine 100 bloom type B | 1.34% |
| Gelatine 250 bloom type A | 4.04% |
| Gellan (Kelcogel ® LT100) CP Kelco | 0.33% |
| Colour | 0.21% |
| Flavour | 0.46% |
| Total: | 100.00% |

Glycerol and propylene glycol were first blended and the creatine was then added. The blend was heated to 65–70° C. In a separate container, the two types of gelatine and the gellan were blended together. The fructose syrup and water were mixed and heated to 60° C., after which the gelatine:gellan mixture was added. The mixture was then heated to 75° C. to allow the components to dissolve. In a third container, the corn syrup was warmed to 30–35° C. and the sucralose, potassium citrate, and starch were then blended in. The corn syrup mixture was combined with the gelatine:gellan mixture and heated to 75–80° C. until the moisture content was reduced and the desired solids level achieved. The creatine mixture is then added together with the colour and flavour additives. The delivery system is then moulded using standard techniques.

Example 7

HPLC Analysis of Creatine Stability

Samples of the delivery system produced by the method described in Example 6 were analyzed by high performance liquid chromatography (HPLC) using UV detection to determine the percentage of creatine. Prior to injection, each sample was subject to a dissolution procedure wherein the sample was cut into small pieces and heated in 400 ml of Type 1 water at 90° C. for 10 minutes. The samples were then transferred to a water bath at 4° C. and 50 ml of 1% perchloric acid was added. The mixture was then heated to 28° C., transferred to a 500 ml volumetric flask and the volume made up to 500 ml with Type 1 water. A 60 μL aliquot of this solution was then added to 140 μL of methanol and vortexed. Three replicates were prepared for each sample. Samples of 10 μL of the final solution were used to inject into the HPLC.

The percentage of creatine (by weight) was determined by comparing the mean response of creatine in each sample to the mean response of a stock solution at known concentrations. For each replicate prepared as described above, the solution was injected in triplicate.

Tables 2 and 3 outline the quantity and percentage creatine in the samples of the delivery system. Of particular note is the only slight variation between the percentage creatine by weight of each jujube despite the larger variation in the weight of the jujubes. The percentage by weight of creatine determined for each jujube varied between 7.71% and 9.04% (% CV=14.1%), while the weight of the jujubes varied from 7082.40 mg to 11124.16 mg. The mean percentage creatine by weight for the samples was 8.0%. This is consistent with the expected amount of 9% of chelate in the final product.

Example 8

In vivo Testing I

Serum concentration levels of creatine of subjects who ingested either 3.5 gram of micronized creatine powder in capsule format or 3.5 gram of micronized creatine in jujubes (prepared as described in Example 4) were analysed by mass spectroscopy. Seven individuals were enrolled in the test, with an age range between 18 and 50 years. Individuals fasted overnight prior to administration of the creatine. The test protocol was as follows. Individuals were administered jujube containing 3.5 g creatine with 8 oz water. Blood samples were taken every 15 minutes for the first hour, every 30 minutes for the second hour and subsequently at hourly intervals for a total of 8 hours after administration. After sufficient period of time to allow blood creatine levels to return to normal, the subjects were administered 5 capsules containing a total of 3.5 g creatine with 8 oz water. Blood samples were taken at the same time intervals as indicated above. Results are shown in FIG. 1.

Example 9

In vivo Testing II

Human serum concentration levels of creatine in subjects who ingested jujubes prepared as described in Example 6 were analysed by HPLC using mass spectroscopy (MS) detection.

In one study, during a period of four days, serum samples from one subject who consumed either (1) 1 gm of creatine monohydrate in a jujube (Day 1A); (2) 500 mg creatine monohydrate/500 mg creatine chelate in the form of a 'mixed' jujube (Day 1B); (3) 1 gm creatine monohydrate powered drink (Day 2A); or (4) 500 mg creatine monohydrate/500 mg creatine chelate powered drink (Day 2B). For the entire study, serum samples were taken over a period of six sampling times. The subject fasted for eight hours prior to dosing.

Figure 2:
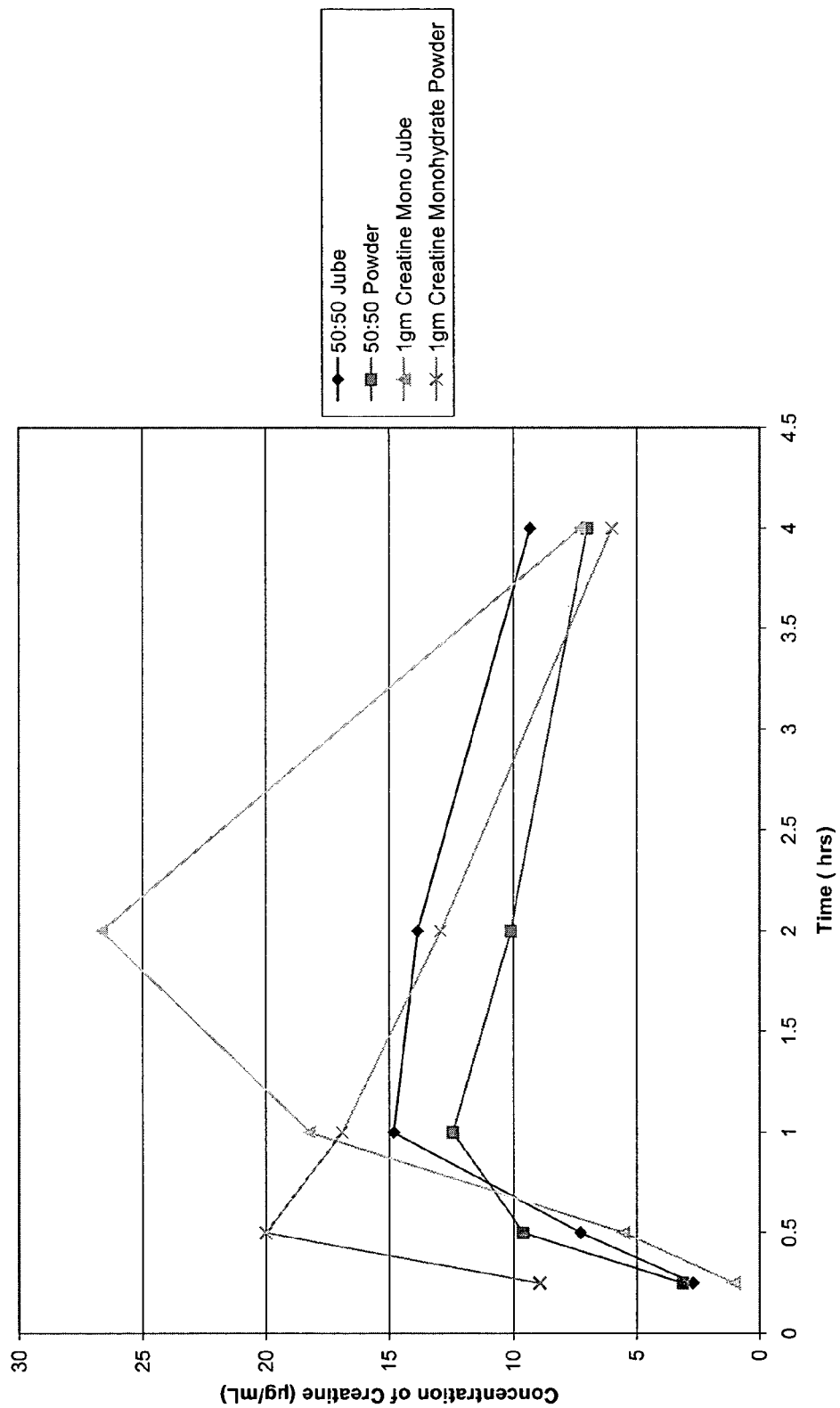
FIG. 2 demonstrates serum concentrations of creatine following administration of the delivery system containing varying creatine chelate and/or creatine monohydrate formulations.

Samples were stored at −20° C.±10° C. for the duration of the analysis. The serum samples were prepared by first adding 50 uL of an internal standard and 20 uL of a 50% perchloric acid solution to 250 uL of the sample, after which they were centrifuged. The supernatant of each sample was then injected into the HPLC/MS system for analysis. The results are plotted in FIG. 2.

The results show that higher serum levels of creatine concentrates were achieved when the subject consumed 1 gm of the creatine monohydrate contained in the jujube compared to values obtained when the subject consumed the creatine powered drinks or the 'mixed' jujube containing both creatine monohydrate and creatine chelate. Additionally, serum creatine levels were also capable of being maintained for a longer period of time when the subject consumed the jujube containing creatine monohydrate. The higher serum creatine level over a longer period of time was also noted as creatine levels were still elevated after two hours following ingestion of the creatine monohydrate jujube.

Example 10

Delivery System for Creatine

Another example of a delivery system containing creatine is as follows:

| Ingredient | % by Weight |
|---|---|
| Glycerol | 15.97% |
| Propylene Glycol | 5.51% |
| Creatine Monohydrate | 16.71% |
| 63 DE Corn syrup | 21.20% |
| High Fructose Corn Syrup | 24.78% |
| Gelatine 250 Bloom Type A | 5.51% |
| Gellan | 0.33% |
| Sucralose | 0.06% |
| potassium citrate | 1.40% |
| Modified Starch (Staley Miraquick ®) | 2.75% |
| Water | 4.96% |
| Flavour | 0.56% |
| Colour | 0.28% |
| Total: | 100.00% |

Creatine was added to a mixture of glycerol and propylene glycol, and heated to 40–60° C. The syrups were blended with water and the dry ingredients were mixed into the syrup mixture. The combined mixture was then heated to at least 80° C. Alternatively, the blended dry ingredients can be blended in with simultaneous live steam injection to reach at least 80° C. The solid content was then adjusted by addition of water if necessary to provide a final moisture content of between about 10% to about 30%. At this point, the temperature of the syrup mixture was lowered to between 50° C. and 80° C. and the glycerol-glycol mixture was added. Colour and/or flavouring additives were then added and the delivery system was injection filled into the preformed packaging.

Example 11

HPLC Analysis of Creatine Stability

Samples of the delivery system produced by the method described in Example 10 were analyzed by HPLC using UV detection to determine the percentage of creatine monohydrate by weight of each sample. Prior to injection, each sample was subject to a dissolution procedure wherein the sample was cut into small pieces and heated in 200 ml of water at 90° C. for 10 minutes, then transferred to a water bath at 4° C. The mixture was subsequently heated to 28° C., transferred to a 250 ml volumetric flask and the volume made up to 250 ml with water. After mixing, a 1 ml aliquot of the mixture was placed into an Eppendorf tube and centrifuged at 10 000 rpm. The supernatant was filtered through a 0.2μ filter and centrifuged again at 10 000 rpm. A 5 μl sample of the supernatant was then taken for HPLC analysis. Three injections were made for each sample preparation.

The results of the HPLC analysis are given in Tables 4 and 5. Both the weight of the jujubes and the percentage by weight of creatine contained within each sample are notably uniform. The weight of the jujubes varied from 26 262.37 mg to 26 954.56 mg, with an average value of 26 774.37 mg, and the percentage by weight of creatine varied from 11.75% to 11.85%, with an average value of 11.80%.

Example 12

Accelerated Shelf-Life Determination

An accelerated shelf life test was conducted on the creatine delivery system prepared by the method described in Example 10. Microbial analysis was conducted using approved methods as described in *The Compendium of Analytical Methods: HPB Methods for the Microbiological Analysis of Foods* (Volume 2) issued by the Health Products and Food Branch of Health Canada. After subjecting samples of the delivery system to a temperature of 35° C. and a relative humidity of 45–55% for a period of 35 days, the samples were tested for the presence of various microorganisms as listed in Table 6. The average water activity of the samples tested was approximately 0.51.

In addition to the above microbial analysis, the creatine level in each sample was determined by HPLC prior to the test and after 35 days. The average creatine content for four samples randomly selected for analysis after 35 days was compared to the average creatine content for three samples taken prior to the shelf life test. HPLC analysis of creatine monohydrate levels was conducted as described in Example 11.

The results, as shown in Table 6, indicate that after a period of 35 days at the above-described conditions, microbial contamination was minimal and well below accepted levels. Based on these results, the delivery system is shown to have a stable shelf life of at least one year from the date of manufacture.

Results from the HPLC analysis also indicated that levels of creatine monohydrate remained stable in the jujubes after 35 days exposure to the above-described conditions. Prior to the start of the experiment, three jujubes had an average of 13.4% by weight of creatine monohydrate. After 35 days, four jujubes were shown to have an average of 14.2% by weight of creatine monohydrate, which is within the error limits of the analysis performed.

Example 13

Analysis of Water Activity of the Delivery System

Water activity was measured in samples of jujubes that had been prepared according to the method described in Example 10.

The procedure for measuring water activity is based on the fact that the water activity of a sample is equal to the relative humidity created by the sample in a closed environment when in equilibrium. The procedure uses a water activity meter constructed by David Brookman & Associates (DB&A). The DB&A Water Activity Meter uses an Omega Engineering HX92C Relative Humidity indicator to measure the relative humidity within a closed environment containing the sample. The Omega probe converts the relative humidity (R.H.) into milliamperes (ma), where 4 ma equals 0% R.H. and 20 ma equals 100% R.H. The water activity meter is calibrated to 11.3% R.H. using a saturated solution of LiCl and to 75.3% R.H. using a saturated solution of NaCl.

The samples are manually macerated in a plastic bag and then transferred to a 30 ml sample bottle. The bottles are filled with sample to at least 1 cm from the shoulder. The bottles are capped until use and stored at room temperature. Measurements are taken by screwing the sample bottle onto the DB&A meter probe and the bottle probe assembly is maintained in a vertical position in a rack. Measurements are taken at hourly intervals at room temperature (20–22° C.) until such time that successive readings do not vary more than 1%.

Random sampling of the jujubes was conducted. The water activity ($a_w$) was determined to be 0.507, 0.515 and 0.544. These values are well below levels those that favour the growth of microorganisms. It has been shown that microorganisms generally grow best between $a_w$ values of 0.995–0.980 and most microbes will cease to grow at $a_w$ values less than 0.900.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

Examples of delivery systems and suggested functional ingredients for incorporation therein

| Formulation | Suggested Functional Ingredients[1] |
|---|---|
| Energy formulation | Ginseng, chromium picolinate, chromium chelate, Rhodiola crenulata |
| Weight loss formulation | Caffeine, ephedra, conjugated linoleic acids (CLA) |
| Thermogenic formulation | Caffeine, tocopherols, Citrus aurantium, ephedra alkaloids, |
| Memory enhancement | Ginkgo biloba, goto kola |
| Sexual health | Yohimbe, Kubu pepper |
| Antioxidant | Vitamin E, Vitamin C, Alpha Lipoic Acid (ALA) |
| Bone health | Calcium, magnesium, vitamin C |
| Joint health | Methylsulphonylmethane (MSM), glucosamine, chondroitin |
| Cold prevention | Echinacea, zinc, vitamin C, |
| Vitamin and/or mineral supplements (particularly formulations for children) | B-Vitamin complex, D vitamins, Vitamin C, Vitamin co-factors |
| Dietary supplements | Essential fatty acids, amino acids, |
| Muscle enhancement | Creatine, dimethylglycine, pregnenolone, amino acids, |
| Sports nutrition | Dehydroepieandrosterone (DHEA), pregnenolone, |
| Probiotics | Acidiphilus, Bifidus, prebiotics, |
| Digestive aids | Bromelain, papain, lipases, probiotics, |
| Anti-aging formulations | Omega-3 fatty acids, lignan, S-adenosyl methionine(SAMe), melatonin |
| Seniors formulations | Calicum, omega-3 fatty acids, SAMe |
| Women's health | Soy isoflavanones |
| Cardiovascular health | Arginine, Siberian Ginseng, Vitamin B6, CoQ 10, Rhodiola crenulata |

[1]Delivery systems may contain one, or a combination, of the listed functional ingredients

TABLE 2

Peak Height Responses and Determined Quantity (Mg) of Creatine Monohydrate Chelate in Jujubes

| | Reference Stock | Jujube No. 1 | 2 | 3 | 4 | 5 | 6 | 7 | 8 | 9 |
|---|---|---|---|---|---|---|---|---|---|---|
| | 394.09 | 452.48 | 570.96 | 589.83 | 622.90 | 600.57 | 477.41 | 618.16 | 530.70 | 648.05 |
| | 388.77 | 481.39 | 563.36 | 602.88 | 635.36 | 631.99 | 488.51 | 628.59 | 537.26 | 649.14 |
| | 385.00 | 505.71 | 601.46 | 598.41 | 636.37 | 648.53 | 457.92 | 615.64 | 527.72 | 630.77 |
| MEAN | 389.29 | 479.86 | 578.59 | 597.04 | 631.54 | 627.03 | 474.61 | 620.80 | 531.89 | 642.65 |
| S.D. | 4.57 | 26.65 | 20.16 | 6.63 | 7.50 | 24.36 | 15.49 | 6.87 | 4.88 | 10.31 |
| % CV | 1.2 | 5.6 | 3.5 | 1.1 | 1.2 | 3.9 | 3.3 | 1.1 | 0.9 | 1.6 |
| Creatine Monohydrate Chelate per Jujube (mg)[1] | | 640.37 | 772.13 | 796.75 | 842.79 | 836.77 | 633.37 | 828.45 | 709.81 | 857.62 |

[1]Calculated as the (Mean Peak Height of Jujube Solutions)/(Mean Peak Height of Reference Stock Solutions) × (1039 μg/mL) × (500 mL)/(1000)

TABLE 3

Percentage Creatine Monohydrate Chelate by Weight in Jujubes

| Jujube No. | Weight (mg) | Determined Concentration of Creatine Monohydrate Chelate (mg) | % Creatine Monohydrate Chelate by Weight (%) |
|---|---|---|---|
| 1 | 7082.40 | 640.37 | 9.04 |
| 2 | 9620.96 | 772.13 | 8.03 |
| 3 | 10299.80 | 796.75 | 7.74 |
| 4 | 10583.38 | 842.79 | 7.96 |

TABLE 4

Percentage Creatine Monohydrate by weight in Jujubes

| Jujubes | Weight/mg | Determined Conc. of Creatine/mg | % Creatine by weight |
|---|---|---|---|
| 1 | 26954.56 | 3175.55 | 11.78% |
| 2 | 26262.37 | 3110.82 | 11.85% |
| 3 | 25807.23 | 3151.85 | 11.75% |
| 4 | 28925.42 | 3181.04 | 11.81% |
| 5 | 26848.04 | 3168.55 | 11.80% |
| 6 | 26847.58 | 3165.65 | 11.80% |
| Average | 26774.37 | 3159.41 | 11.80% |

TABLE 5

Peak Height Responses of Creatine Monohydrate in Jujubes

| | Peak Area | | | | | |
|---|---|---|---|---|---|---|
| | No. 22 Jujube 1 | No. 23 Jujube 2 | No. 24 Jujube 3 | No. 25 Jujube 4 | No. 15 Jujube 5 | No. 27 Jujube 6 |
| | 25051.20 | 24550.57 | 24829.29 | 25080.93 | 25031.10 | 25010.23 |
| | 25977.39 | 24559.88 | 24921.40 | 25137.22 | 25023.13 | 25027.83 |
| | 25105.90 | 24591.11 | 24922.88 | 25147.54 | 25014.97 | 25024.65 |
| Average | 25078.50 | 24567.18 | 24897.19 | 25121.76 | 25023.07 | 25023.94 |
| Std. Dev | 27.87 | 21.24 | 53.02 | 35.71 | 8.07 | 4.39 |
| CV | 0.1% | 0.1% | 0.2% | 0.1% | 0.0% | 0.0% |

TABLE 3-continued

Percentage Creatine Monohydrate Chelate by Weight in Jujubes

| Jujube No. | Weight (mg) | Determined Concentration of Creatine Monohydrate Chelate (mg) | % Creatine Monohydrate Chelate by Weight (%) |
|---|---|---|---|
| 5 | 10535.61 | 836.77 | 7.94 |
| 6 | 7895.14 | 633.37 | 8.02 |
| 7 | 10434.55 | 828.45 | 7.94 |
| 8 | 9095.45 | 709.81 | 7.80 |
| 9 | 11124.16 | 857.62 | 7.71 |
| MEAN | 9630.16 | 768.67 | 8.02 |
| S.D. | 1362.14 | 87.07 | 0.40 |
| % CV | 14.1 | 11.3 | 5.0 |

TABLE 6

Microbial Analysis of Creatine Monohydrate Jujubes - Accelerated Shelf Life Determination
Water activity: approximately 0.51
Time: 35 days
Temperature: 35° C.
Humidity: 45–55%

| TEST CONDUCTED | HPB REFERENCE NUMBER | RESULTS (No. Colonies/gm product) |
|---|---|---|
| Total aerobic plate count | MFHPB-18 | <10 |
| Total coliforms | MFHPB-34 | <10 |
| E. Coli | MFHPB-34 | <10 |
| Yeast | MFHPB-22 | <50 |
| Mould | MFHPB-22 | <50 |
| Yeast Osmophilic | MFHPB-22 | <50 |
| Mould Osmophilic | MFHPB-22 | <50 |

TABLE 6-continued

Microbial Analysis of Creatine Monohydrate Jujubes -
Accelerated Shelf Life Determination
Water activity: approximately 0.51
Time: 35 days
Temperature: 35° C.
Humidity: 45–55%

| TEST CONDUCTED | HPB REFERENCE NUMBER | RESULTS (No. Colonies/gm product) |
|---|---|---|
| Staphylococcus aureus | MFHPB-21 | <25 |
| Salmonella | MFHPB-20 | not detected |

The invention claimed is:

1. A process for preparing a semi-solid oral gel delivery system for nutritional supplements comprising the steps of:
   a) dispersing an effective amount of one or more nutritional supplements in a solvent at or below a temperature of 70° C. to provide a solvent mixture, said solvent comprising glycerol and optionally one or more other polyhydric alcohols;
   b) blending said solvent mixture at a temperature between about 50° C. and 80° C. with a blend comprising: (i) one or more starches, or a modified version thereof; (ii) optionally one or more other carbohydrates, (iii) one or more hydrocolloids, (iv) one or more sugars, sugar alcohols or sugar syrups, or a combination thereof, and (v) optionally water, to provide a flowable matrix in which said one or more nutritional supplements are substantially uniformly dispersed; and
   c) moulding said matrix and allowing it to cool to provide said semi-solid oral gel delivery system,
   wherein said oral gel delivery system is flowable at and above a temperature of about 45° C. wherein said semi-solid oral gel delivery system is formulated to have a final moisture content of about 10% to about 30% by weight and a water activity less than about 0.7, and comprises between about 5% and about 35% by weight of said solvent; between about 1% and about 15% by weight of said one or more starches or modified version thereof, and said optional one or more other carbohydrates; between about 0.1% and about 7% by weight of said one or more hydrocolloids; between about 20% and about 60% by weight of said one or more sugars, sugar alcohols, or sugar syrup; or combination thereof, and less than about 25% by weight of said one or more nutritional supplements, and wherein said one or more nutritional supplements are selected from the group consisting of: antioxidants, amino acids, amino acid derivatives, botanical extracts, joint health nutrients, co-enzymes, dipeptides, fatty acids, macro-nutrients, phospholipids, phytochemicals, prebiotics, and trace nutrients.

2. The process according to claim 1, wherein said blend in 31(b) is obtained by combining said one or more starches, or a modified version thereof, said optional one or more other carbohydrates, said one or more hydrocolloids, said one or more sugars, sugar alcohols or sugar syrups, or combination thereof, and optionally water, at a temperature between about 50° C. and 100° C. to provide said blend.

3. The process according to claim 1, wherein said delivery system is formulated to have a final pH between about 2.5 and about 8.5 by adding suitable buffers, acids, or bases.

4. The process according to claim 1, wherein said delivery system is formulated to have a final pH between about 6.0 and about 8.5 by adding suitable buffers, acids, or bases.

5. The process according to claim 1, further comprising the step of adding one or more modified cellulose to said solvent mixture.

6. The process according to claim 1, wherein said one or more hydrocolloids comprise gelatine.

7. The process according to claim 6, wherein said one or more hydrocolloids further comprise gellan or pectin.

8. The process according to claim 1, wherein said blend comprises one or more sugar syrups.

9. The process according to claim 1, wherein said solvent further comprises propylene glycol.

10. The process according to claim 1, further comprising the step of adding a natural or artificial flavouring, a colouring agent, or a combination thereof, to said matrix.

11. The process according to claim 1, wherein said blend further comprises a sweetener, a buffer, or a combination thereof.

12. The process according to claim 2, further comprising the step of pre-heating one or more of said starches or modified versions thereof, said optional carbohydrates, said hydrocolloids, said sugars, sugar alcohols or sugar syrups, or combination thereof, and optionally water.

13. The process according to claim 2, further comprising the step of pre-heating one or more of said sugar syrups, and optionally water.

14. The process according to claim 2, further comprising the step of pre-mixing one or more of said hydrocolloids with one or more of said sugars, sugar alcohols or sugar syrups, and optionally water.

15. The process according to claim 2, wherein said step of combining said one or more starches or modified versions thereof, said one or more carbohydrates, said one or more hydrocolloids, said one or more sugars, sugar alcohols or sugar syrups, or combination thereof, and optionally water, is at a temperature between about 60° C. and 80° C.

16. The process according to claim 1, wherein said one or more nutritional supplements are dispersed in said solvent at a temperature between about 40° C. and about 60° C. in step (a).

17. The process according to claim 1, wherein said matrix is moulded in step (c) using a Mogul process or by injection-filling of pre-formed moulds.

18. The process according to claim 1, wherein said one or more sugars, sugar alcohols or sugar syrups, or combination thereof, provide less than 55% by weight of said matrix.

19. The process according to claim 1, wherein said one or more carbohydrates comprise a modified cellulose.

20. The process according to claim 1, wherein said antioxidants are selected from the group consisting of: aloe extract, black tea extract, β-carotene, co-enzyme $Q_{10}$, green tea extract, isoflavones, and α-lipoic acid.

21. The process according to claim 1, wherein said amino acids are selected from the group consisting of: arginine, glutamine, and taurine.

22. The process according to claim 1, wherein said amino acid derivatives are selected from the group consisting of: L-carnitine, creatine, dimethylglycine and trimethylglycine.

23. The process according to claim 1, wherein said botanical extracts are selected from the group consisting of: aloe extract, black tea extract, *Citrus aurantium* extract, ephedra, fruit extracts, ginseng, green tea extract, guarana extract, *Rhodiola rosea* extract, seabuckthorn extract and yerba mate.

24. The process according to claim 1, wherein said joint health nutrients are selected from the group of: chondroitin, glucosamine and methyl sulfonyl methane.

25. The process according to claim 1, wherein said en-enzyme is co-enzyme $Q_{10}$.

26. The process according to claim 1, wherein said fatty acids are selected from the group consisting of: conjugated linoleic acid, and α-lipoic acid.

27. The process according to claim 1, wherein said macro-nutrients are selected from the group consisting of: calcium, magnesium, methyl sulfonyl methane, phosphorus, potassium, and sodium.

28. The process according to claim 1, wherein said phospholipid is lecithin.

29. The process according to claim 1, wherein said phytochemicals are carotenoids, flavonoids, or a combination thereof.

30. The process according to claim 1, wherein said phytochemicals are selected from the group consisting of: β-carotene, caffeine, and quercetin.

31. The process according to claim 1, wherein said prebiotics are selected from the group consisting of: fructo-oligosaccharides, and inulin.

32. The process according to claim 1, wherein said trace nutrients are selected from the group consisting of: chromium, citrate, copper, selenium, B vitamins, vitamin C, vitamin D, vitamin E and zinc.

33. The process according to claim 1, wherein said one or more nutritional supplements are selected from the group consisting of: aloe extract, arginine, black tea extract, caffeine, calcium, L-carnitine, β-carotene, chondroitin, chromium, citrate, *Citrus aurantium* extract, co-enzyme $Q_{10}$, conjugated linoleic acid, copper, creatine, dimethylglycine, ephedra, fructo-oligosaccharides, fruit extract, ginseng, glucosamine, glutamine, green tea extract, guarana extract, inulin, isoflavones, lecithin, α-lipoic acid, magnesium, methyl sulfonyl methane, phosphorus, potassium, quercetin, *Rhodiola rosea* extract, seabuckthorn extract, selenium, sodium, taurine, trimethylglycine, B vitamins, vitamin C, vitamin D, vitamin E, yerba mate, and zinc.

* * * * *